(12) United States Patent
Perlman et al.

(10) Patent No.: US 11,012,541 B1
(45) Date of Patent: May 18, 2021

(54) RESILIENT TCP CONNECTION SYSTEM

(71) Applicant: Dell Products L.P., Round Rock, TX (US)

(72) Inventors: Radia Perlman, Redmond, WA (US); Joe Ghalam, Greenbrae, CA (US); Joseph LaSalle White, San Jose, CA (US); Mihai Lazar, Nepean (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/670,540

(22) Filed: Oct. 31, 2019

(51) Int. Cl.
*H04L 29/06* (2006.01)
*H04L 29/14* (2006.01)
*H04L 29/08* (2006.01)

(52) U.S. Cl.
CPC .......... *H04L 69/163* (2013.01); *H04L 67/145* (2013.01); *H04L 67/148* (2013.01); *H04L 69/40* (2013.01)

(58) Field of Classification Search
CPC ... H04L 69/163; H04L 67/145; H04L 67/148; H04L 69/40
See application file for complete search history.

(56) References Cited

U.S. PATENT DOCUMENTS

| | | | |
|---|---|---|---|
| 7,003,574 B1* | 2/2006 | Bahl | H04L 29/06 709/203 |
| 2004/0107382 A1* | 6/2004 | Doverspike | H04L 45/62 714/4.1 |
| 2005/0086342 A1* | 4/2005 | Burt | H04L 43/0811 709/224 |
| 2012/0331160 A1* | 12/2012 | Tremblay | H04L 69/163 709/228 |
| 2018/0254979 A1* | 9/2018 | Scahill | H04L 47/193 |

* cited by examiner

*Primary Examiner* — Tan Doan
(74) *Attorney, Agent, or Firm* — Haynes and Boone, LLP

(57) ABSTRACT

A resilient TCP/IP connection system includes a first computing device coupled to a second computing device. The second computing device transmits a first TCP connection establishment communication that includes a first computing device TCP connection identifier to the first computing device. In response, the second computing device receives a second TCP connection establishment communication that includes a second computing device TCP connection identifier from the first computing device, and establishes a first resilient TCP connection with the first computing device. The second computing device then provides the second computing device TCP connection identifier in each TCP/IP communication transmitted to the first computing device via the first resilient TCP connection, and identifies the first computing device TCP connection identifier in each TCP/IP communication received from the first computing device via the first resilient TCP connection.

20 Claims, 16 Drawing Sheets

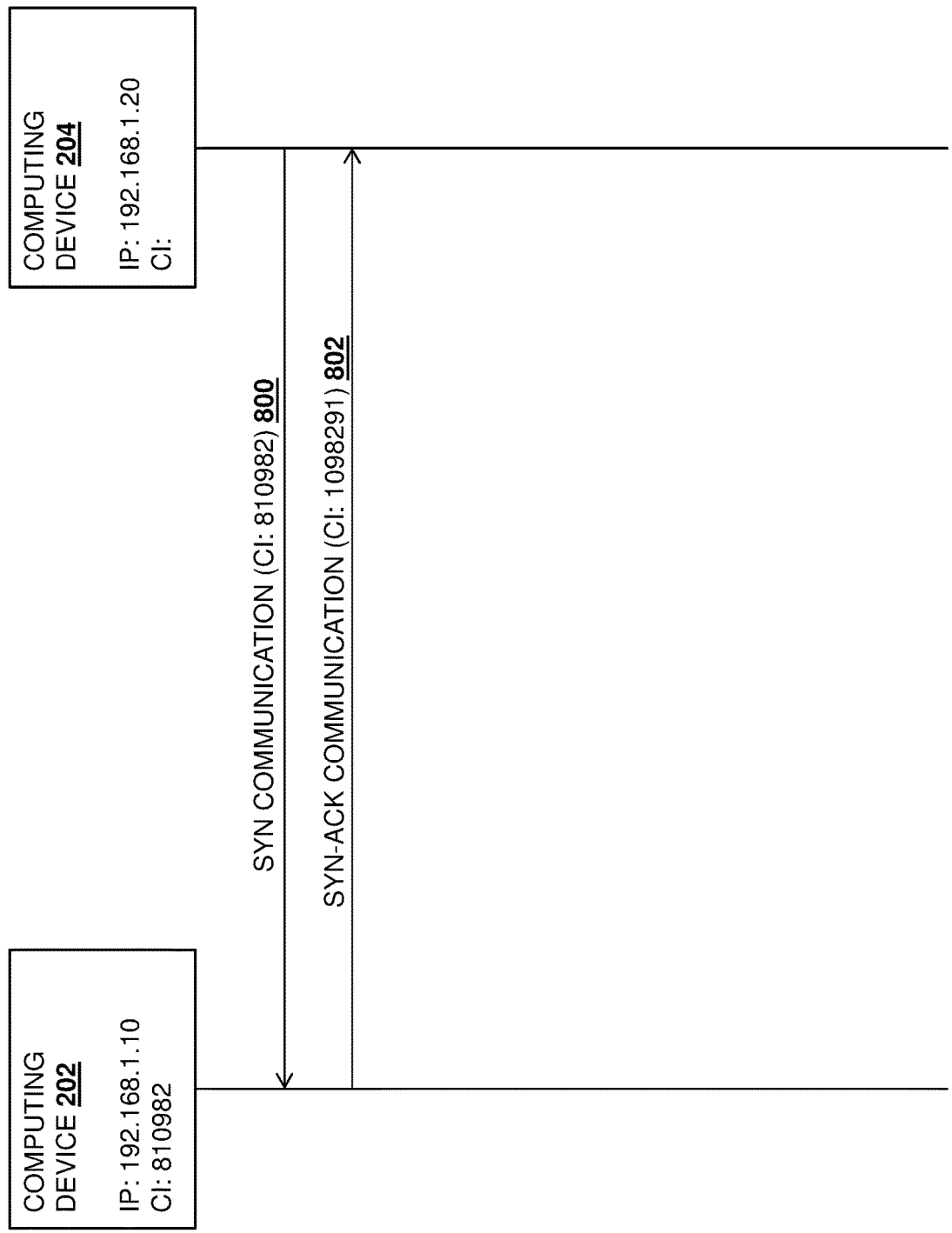

RESILIENT TCP CONNECTION SYSTEM

BACKGROUND

The present disclosure relates generally to information handling systems, and more particularly to providing a resilient TCP connection between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, often communicate via the Transmission Control Protocol/Internet Protocol (TCP/IP). As would be understood by one of skill in the art in possession of the present disclosure, TCP/IP communications include the establishment of a TCP connection that is based on five-tuple information that includes a protocol being used to transmit those TCP/IP communications, source IP address of a source computing device that is involved in those TCP/IP communications, a destination IP address of a destination computing device that is involved in those TCP/IP communications, a source port identifier for a source port on the source computing device that is used to transmit the TCP/IP communications, and a destination port identifier for a destination port on the destination computing device that is used to receive the TCP/IP communications. However, in some situations, the five-tuple information may change after the establishment of the TCP connection, which can cause the TCP connection to end, and requires that the TCP connection be reestablished.

For example, following the establishment of a TCP connection, an IP address of one of the computing devices involved in the TCP/IP communications and/or a port on one of the computing devices that is used for the TCP/IP communications may change prior to the completion of those TCP/IP communications, which will cause the TCP connection to "break" or otherwise end due to that change in five-tuple information. In specific examples, a computing device involved in the TCP/IP communications may change its wireless connection (e.g., to wireless connection with a different Service Set IDentifier (SSID)), or may switch between a wireless connection and a wired connection (e.g., an wired Ethernet connection), thus causing the TCP connection established for those TCP/IP communications to end. In another specific example, a Network Address Translator utilized in the TCP/IP communications may lose its state and assign a new IP address and port to a computing device involved in the TCP/IP communications (i.e., without that computing device perceiving that IP address and port change), thus causing the TCP connection established for those TCP/IP communications to end. In response to such situations, the computing device(s) (e.g., application(s) running on the computing device(s)) may be required to reestablish a new TCP connection.

However, for applications such as those operating according to the File Transfer Protocol (FTP), the ending of a TCP connection may cause issues, as FTP applications operate to deliver data from one computing device to another computing device and may require that data be delivered during a single TCP connection. For example, if the TCP connection between a first computing device and a second computing device ends while the first computing device is transmitting data to the second computing device according to the FTP, the first computing device will not know if data that it transmitted to the second computing device prior to the TCP connection ending but for which it has not received acknowledgements for from the second computing device was actually received by the second computing device. Furthermore, the transmittal by the first computing device of duplicate data for which acknowledgements were not received before the TCP connection ended may be as undesirable as the first computing device failing to transmit that data to the second computing device.

Accordingly, it would be desirable to provide a resilient TCP connection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resilient Transmission Control Protocol (TCP) connection engine that is configured to: transmit, to a first computing device, a first Transmission Control Protocol (TCP) connection establishment communication that includes a first computing device TCP connection identifier; receive, from the first computing device in response to the first connection establishment TCP/IP communication, a second TCP connection establishment communication that includes a second computing device TCP connection identifier; establish, with the first computing device in response to receiving the second TCP connection establishment communication, a first resilient TCP connection; provide, in each TCP/IP communication transmitted to the first computing device via the first resilient TCP connection, the second computing device TCP connection identifier; and identify, in each TCP/IP communication received from the first computing device via the first resilient TCP connection, the first computing device TCP connection identifier.

BRIEF DESCRIPTION OF THE DRAWINGS

FIG. 8A is a swim-lane diagram illustrating an embodiment of symmetric resilient TCP connection establishment by the resilient TCP connection system of FIG. 2 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
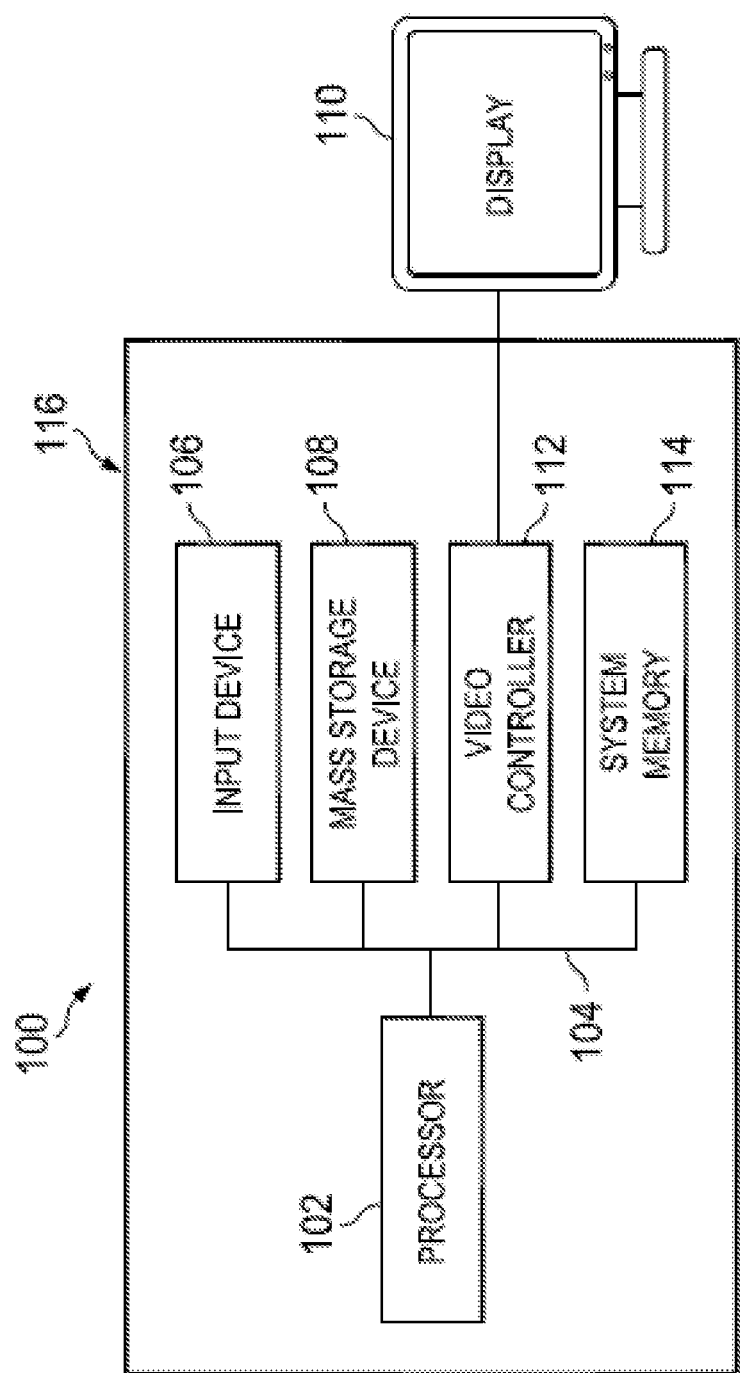
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
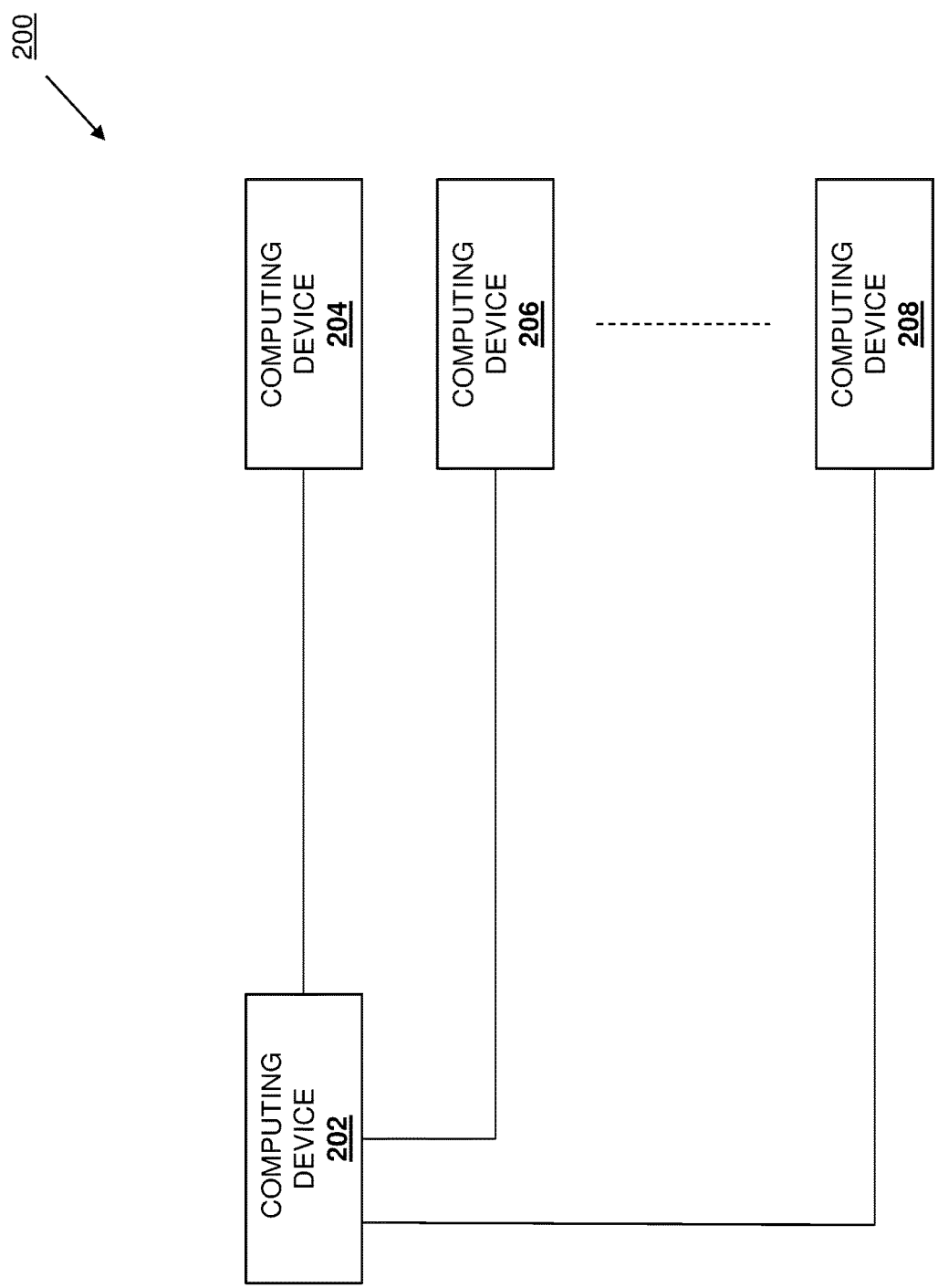
FIG. 2 is a schematic view illustrating an embodiment of a resilient TCP connection system.

Referring now to FIG. 2, an embodiment of a resilient TCP connection system 200 is illustrated. In the illustrated embodiment, the resilient TCP connection system 200 includes a computing device 202 that is coupled to each of a computing device 204, a computing device 206, and up to a computing device 208. In an embodiment, any or all of the computing devices 202-208 may be provided by the IHS 100 discussed above with reference to FIG. 1, and/or may include some or all of the components of the IHS 100, and in specific examples may be provided by server computing devices, storage computing devices, networking computing devices, desktop computing devices, laptop/notebook computing devices, tablet computing devices, mobile phones, and/or other computing devices that would be apparent to one of skill in the art in possession of the present disclosure. However, while illustrated and discussed as being provided by specific computing devices, one of skill in the art in possession of the present disclosure will recognize that computing devices provided in the resilient TCP connection system 200 may include any devices that may be configured to operate similarly as the computing devices discussed below that perform TCP/IP communications via a TCP connection. While a specific resilient TCP connection system 200 has been illustrated and described, one of skill in the art in possession of the present disclosure will recognize that the resilient TCP connection system of the present disclosure may include a variety of components and component configurations while remaining within the scope of the present disclosure as well.

Figure 3:
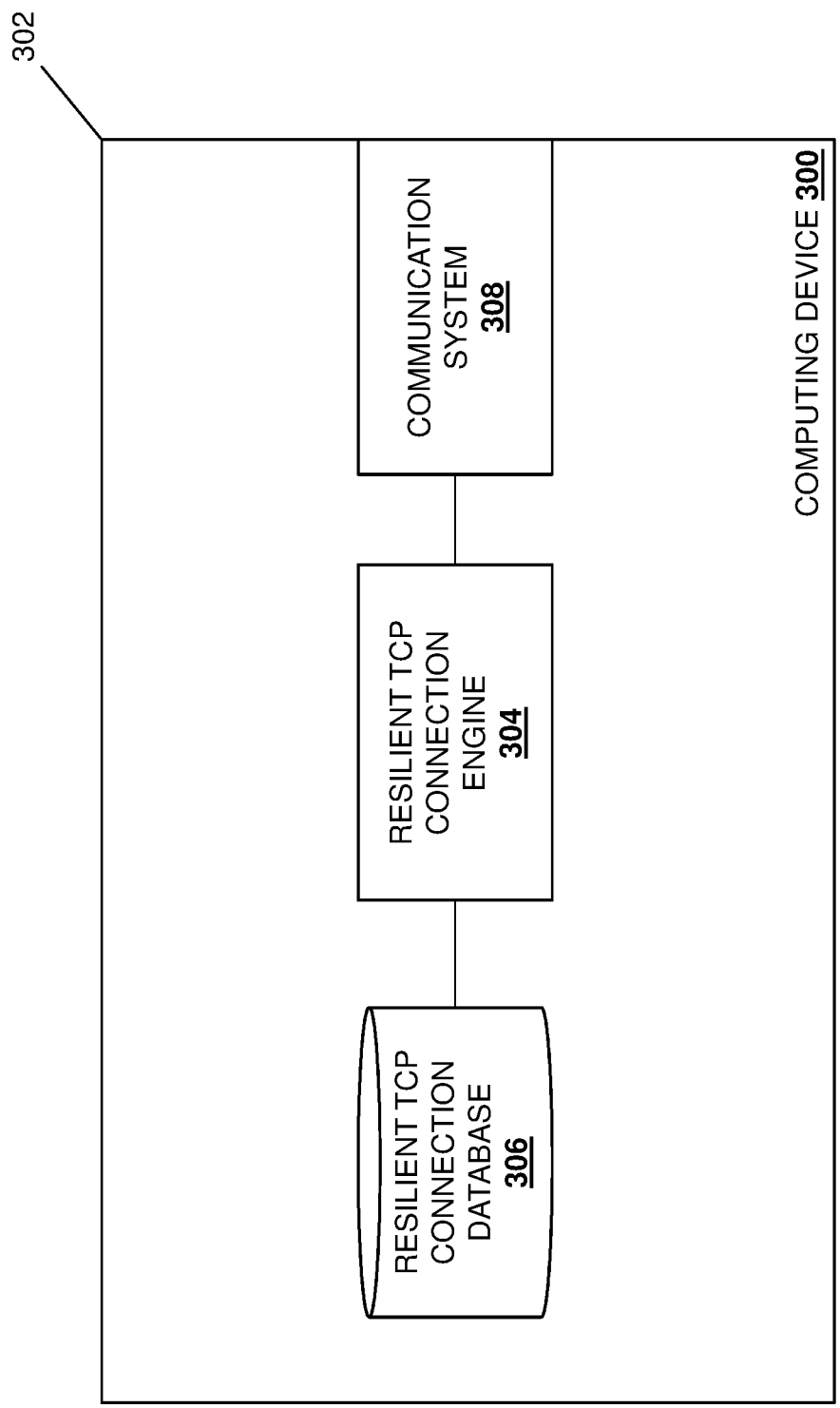
FIG. 3 is a schematic view illustrating an embodiment of a computing device that may be provided in the resilient TCP connection system.

Referring now to FIG. 3, an embodiment of a computing device 300 is illustrated that may provide any or all of the computing devices 202-208 discussed above with reference to FIG. 2. As such, the computing device 300 may be provided by the IHS 100 discussed above with reference to FIG. 1 and/or may include some or all of the components of the IHS 100, and in specific examples may be provided by server computing devices, storage computing devices, networking computing devices, desktop computing devices, laptop/notebook computing devices, tablet computing devices, mobile phones, and/or other computing devices that would be apparent to one of skill in the art in possession of the present disclosure. Furthermore, while illustrated and discussed as being provided by specific computing devices, one of skill in the art in possession of the present disclosure will recognize that the functionality of the computing device 300 discussed below may be provided by other devices that are configured to operate similarly as the computing devices 300 discussed below. In the illustrated embodiment, the computing device 300 includes a chassis 302 that houses the components of the computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a resilient TCP connection engine 304 that is configured to perform the functionality of the resilient TCP connection engines and/or computing devices discussed below.

The chassis 302 may also house a storage system (not illustrated, but which may include the storage 108 discussed above with reference to FIG. 1) that is coupled to the resilient TCP connection engine 304 (e.g., via a coupling between the storage system and the processing system) and that includes a resilient TCP connection database 306 that is configured to store any of the information utilized by the resilient TCP connection engine 304 discussed below. The chassis 302 may also house a communication system 308 that is coupled to the resilient TCP connection engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4A:
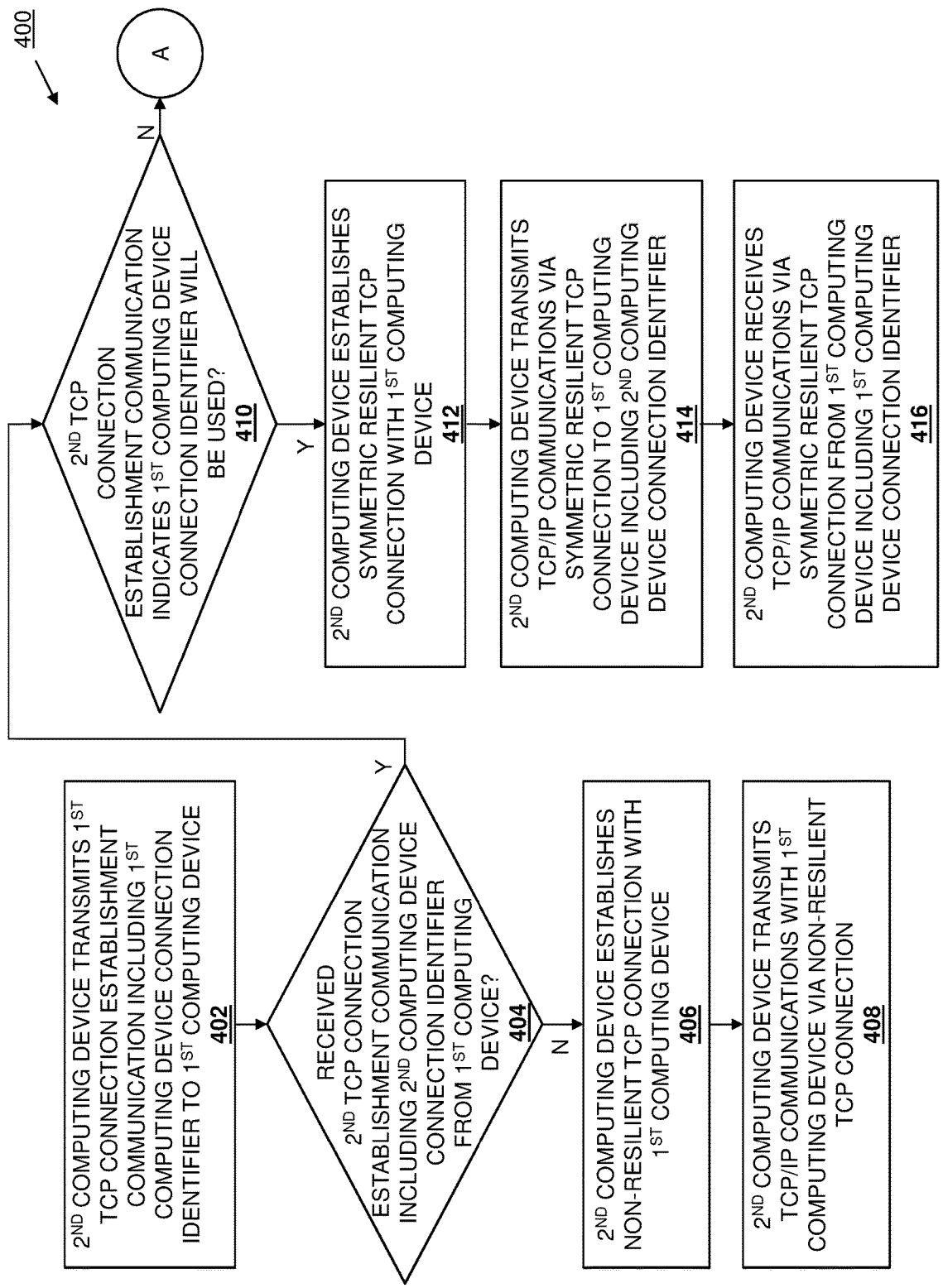
FIG. 4A is a flow chart illustrating an embodiment of a portion of a method for providing a resilient TCP connection.
Figure 4B:
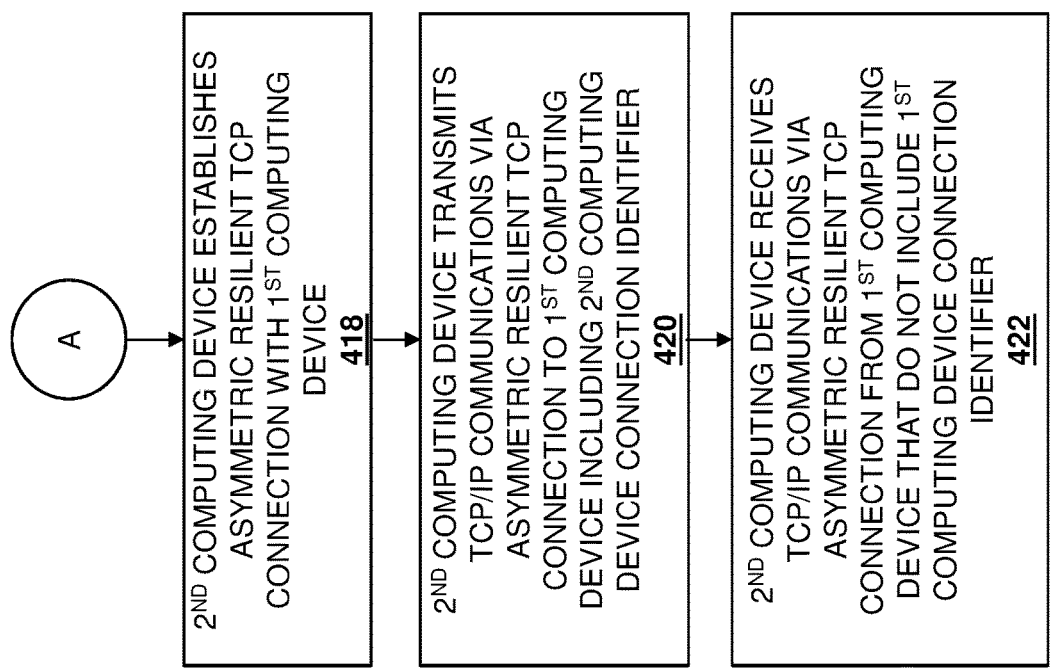
FIG. 4B is a flow chart illustrating an embodiment of a portion a method for providing a resilient TCP connection.

Referring now to FIGS. 4A and 4B, an embodiment of a method 400 for providing a resilient TCP connection is illustrated. As discussed below, the systems and methods of the present disclosure introduce the concept of a "connection identifier" into TCP/IP communications provided via a TCP connection, which allows a second computing device to identify TCP/IP communications with a first computing device based on the connection identifier utilized by the first computing device in those TCP/IP communications even when the IP address of that first computing device (or port on that first computing device that is used to transmit the TCP/IP communications) changes following the establishment of the TCP connection. For example, a second computing device may transmit a first TCP connection establishment communication that includes a first computing device TCP connection identifier to the first computing device and, in response, may receive a second TCP connection establishment communication that includes a second computing device TCP connection identifier from the first computing device. The second computing device may then establish a resilient TCP connection with the first computing device that is enabled by the second computing device providing the second computing device TCP connection identifier in each TCP/IP communication transmitted to the first computing device via the first resilient TCP connection, and identifying the first computing device TCP connection identifier in each TCP/IP communication received from the first computing device via the first resilient TCP connection. As will be appreciated by one of skill in the art in possession of the present disclosure, the use of the first and second computing device TCP connection identifiers in the TCP/IP communications enable the resilient TCP connection by allowing that resilient TCP connection to continue even in the event of IP address changes, port changes, and/or other five-tuple information changes associated with the first and second computing devices that would cause a conventional TCP connection to "break" or end.

Figure 5:
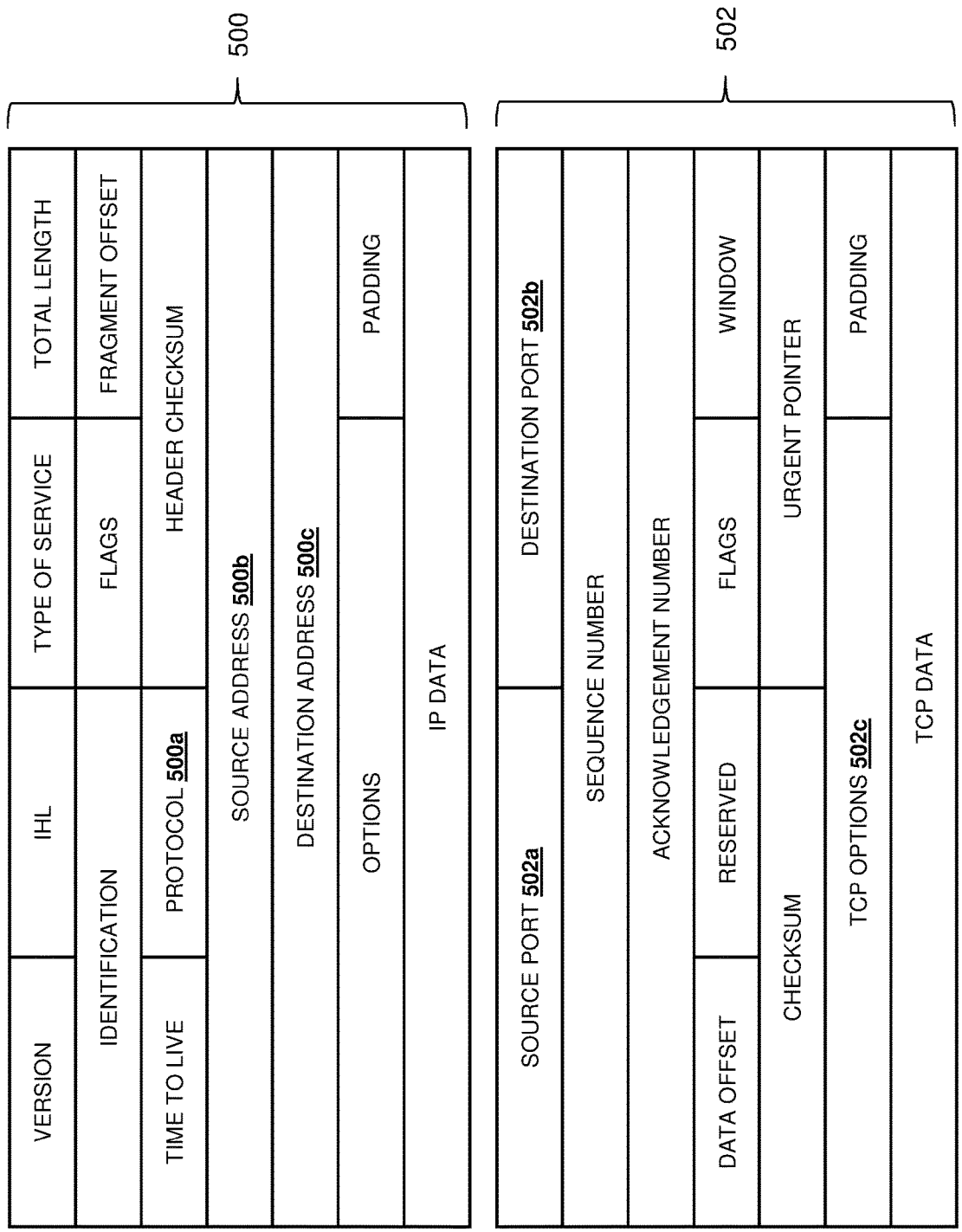
FIG. 5 is a schematic view illustrating an embodiment of TCP/IP communication information.

In the embodiments of the resilient TCP connection system discussed below, communications between computing devices may utilize information stored in conventional TCP headers and IP headers. For example, with reference to FIG. 5, an embodiment of IP communication information 500 and TCP communication information 502 is illustrated that may be included in any or all of the communications transmitted between the computing devices discussed below. As can be seen in FIG. 5, the IP communication information 500 includes a protocol field 500a that is configured to store protocol information identifying a protocol being used to transmit the communications, a source address field that is configured to store an IP source address of the computing device transmitting the communications, a destination address field 500c that is configured to store a destination address of the computing device to which the communications are being transmitted, as well as a variety of other IP communication information known in the art. As can also be seen in FIG. 5, the TCP communication information 502 includes a source port field 502a that is configured to store a source port identifier for a port on the computing device that is used to transmit the communications, a destination port field 502b that is configured to store a destination port identifier for a port on the computing device to which the communications are being transmitted, a TCP options field 502c that is configured to store TCP options information, as well as a variety of other TCP communication information known in the art. However, while specific communication information is illustrated in FIG. 5, one of skill in the art in possession of the present disclosure will appreciate that the teachings of the present disclosure may be utilized with other communications and utilizing other communication information while remaining within the scope of the present disclosure as well.

As will be appreciated by one of skill in the art in possession of the present disclosure, conventional TCP connections may be defined by five-tuple information that includes protocol information in the protocol field 500a, the source IP address in the source address field 500b, the destination IP address in the destination address field 500c, the source port identifier in the source port field 502a, and the destination port identifier in the destination port field 502b. As such, when a component of that five-tuple changes, the TCP connection may "break" or end, and may require a new TCP connection to be established. For example, in the event the destination IP address utilized by a destination computing device changes (e.g., the destination computing device switches between wireless networks with different SSIDs or switches between a wireless connection and a wired connection, or a Network Address Translator utilized in the TCP/IP communications provided via the TCP connection loses its state and assigns a new IP address and port to the destination computing device), the five-tuple information will change and cause the existing TCP connection with the source computing device to "break" or end, thus requiring a new TCP connection to be established in order to complete the TCP/IP communications. However, while a few specific examples are provided, one of skill in the art in possession of the present disclosure will appreciate that conventional TCP connections based on five-tuple information may end due to a variety of situations (e.g., a change in the IP address of the source device, a switch to using a different port to transmit the TCP/IP communications by the source and/or destination computing device, etc.) that may be remedied by the teachings of the present disclosure, and those situations are envisioned as falling within the scope of the present disclosure as well.

Figure 6:
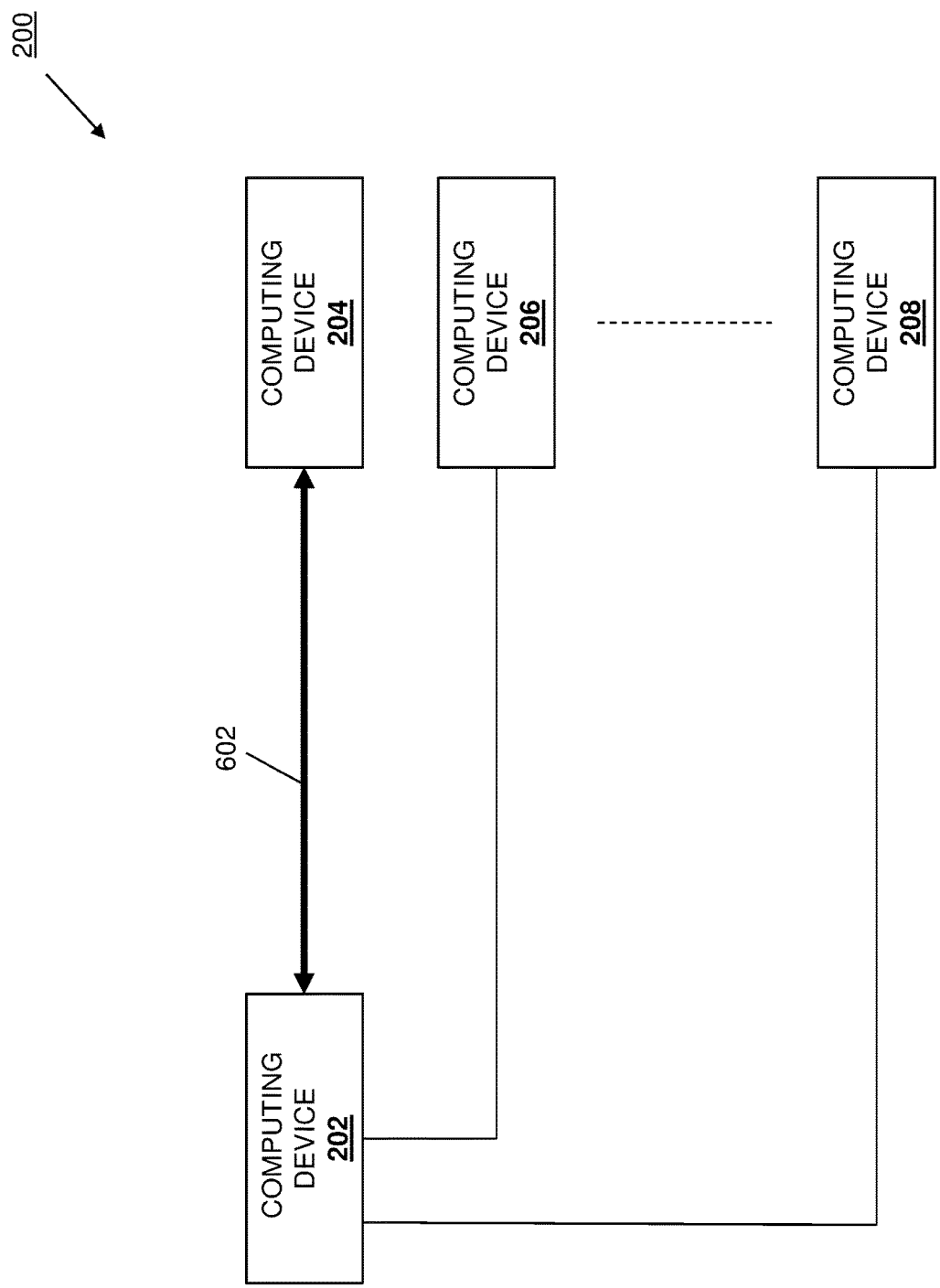
FIG. 6 is a schematic view illustrating an embodiment of the resilient TCP connection system of FIG. 2 operating during the method of FIG. 4.

The method 400 begins at block 402 where a second computing device transmits a first TCP connection establishment communication including a first computing device connection identifier to a first computing device. With reference to FIG. 6, in an embodiment of block 402, the computing device 202 (the "first computing device" in this example) and the computing device 204 (the "second computing device" in this example) may exchange communications 602. With reference to the examples provided in FIGS. 7, 8A, 8B, 8C, and 8E, the computing device 202 may begin the method 400 with an IP address of "192.168.1.10", while the computing device 204 may begin the method 400 with an IP address of "192.168.1.20". As such, with reference to FIG. 7, at block 402 the resilient TCP connection engine 304 in the computing device 204/300 may generate and transmit a first TCP connection establishment communication via its communication system 308 to the computing device 202 that, in the illustrated embodiment, is provided by a SYNchronization (SYN) communication 700. Similarly, with reference to FIG. 8, at block 402 the resilient TCP connection engine 304 in the computing device 204/300 may generate and transmit a first TCP connection establishment communication via its communication system 308 to the computing device 202 that, in the illustrated embodiment, is provided by a SYNchronization (SYN) communication 800

As will be appreciated by one of skill in the art in possession of the present disclosure and with reference to FIG. 5, the SYN communication 700/800 transmitted by the computing device 204 at block 402 may include the five-tuple information discussed above that is conventionally used to define a conventional TCP connection, and thus may include protocol information for the protocol being used to transmit the SYN communication 700/800 in the protocol field 500a of the IP communication information 500, the IP address ("192.168.1.20") of the computing device 204 (i.e., a source IP address of a source computing device in this example) in the source address field 500b of the IP communication information 500, the IP address ("192.168.1.20") of the computing device 202 (i.e., a destination IP address of a destination computing device in this example) in the destination address field 500c of the IP communication information 500, a port identifier for the port on the computing device 204 that is being used to transmit the SYN communication 700/800 (i.e., a source port identifier of a source computing device in this example), and a port identifier for the port on the computing device 202 to which the SYN communication 700/800 is being sent (i.e., a destination port identifier of a destination computing device in this example.)

In addition, the SYN communication 700/800 may also includes a first computing device connection identifier (CI: 810982 in the example provided) that is generated by the resilient TCP connection engine 304 in the computing device 204/300 and provided to the computing device 202 for use in TCP/IP communications via a resilient TCP connection in the event the computing device 202 supports such resilient TCP connections. For example, the first computing device connection identifier may be provided by any identifier that is locally unique to the computing device 204 and not currently in use as described below. In an embodiment, the first computing device connection identifier may be provided in one of the TCP options fields 502c in the TCP communication information 502. For example, a "TCP_RESILIENT" TCP option field may be defined in the TCP options fields 502c in the TCP communication information 502, and the computing device 204 may provide the first computing device connection identifier (CI: 810982 in the example provided) in that TCP option field to, in effect, instruct the computing device 202 to utilize the first computing device connection identifier to identify itself in any subsequent communications with the computing device 204. However, while a specific example has been provided, one of skill in the art in possession of the present disclosure will appreciate that other techniques for transmitting the connection identifier of the present disclosure between computing device may be utilized while remaining within the scope of the present disclosure as well.

The method 400 then proceeds to decision block 404 where it is determined whether a second TCP connection establishment communication including a second computing device connection identifier has been received from the first computing device. In an embodiment, at decision block 404 and following the transmission of the SYN communication 700/800 at block 402, the resilient TCP connection engine 304 in the computing device 204/300 may monitor whether the computing device 202 has responded with a second TCP connection establishment communication that includes a second computing device connection identifier. As discussed in further detail below with reference to FIG. 7, in some embodiments of the present disclosure the computing device 202 may not support the resilient TCP connection functionality of the present disclosure, and may respond to the SYN communication 700 transmitted at block 402 with a SYNchronize-ACKnowledgement (SYN-ACK) communication that does not include a second computing device identifier. As such, in those examples, the resilient TCP connection engine 304 in the computing device 204/300 may determine that a SYN-ACK communication has been received that does not include a second computing device identifier.

As also discussed in further detail below with reference to FIGS. 8A-8D, in some embodiments of the present disclosure the computing device 202 may support the resilient TCP connection functionality of the present disclosure, and may respond to the SYN communication 800 transmitted at block 402 with a SYNchronize-ACKnowledgement (SYN-ACK) communication that includes a second computing device identifier. As such, in those examples, the resilient TCP connection engine 304 in the computing device 204/

300 may determine that a SYN-ACK communication has been received that includes a second computing device identifier. As also discussed in further detail below with reference to FIGS. 8E and 8F, in some embodiments of the present disclosure the computing device 202 may support the resilient TCP connection functionality of the present disclosure but may determine that its IP address and/or port used to transmit communications with the computing device 204 is not expected to change, and may respond to the SYN communication 800 transmitted at block 402 with a SYNchronize-ACKnowledgement (SYN-ACK) communication that includes a second computing device identifier but that also indicates that it will not use the first computing device connection identifier. As such, in those examples, the resilient TCP connection engine 304 in the computing device 204/300 may determine that a SYN-ACK communication has been received that includes a second computing device identifier. However, while a few specific examples of the determination of whether a second TCP connection establishment communication including a second computing device connection identifier has been received from the first computing device, one of skill in the art in possession of the present disclosure will appreciate that second TCP connection establishment communications and second computing device connection identifiers may be received in a variety of manners that will fall within the scope of the present disclosure as well.

Figure 7:
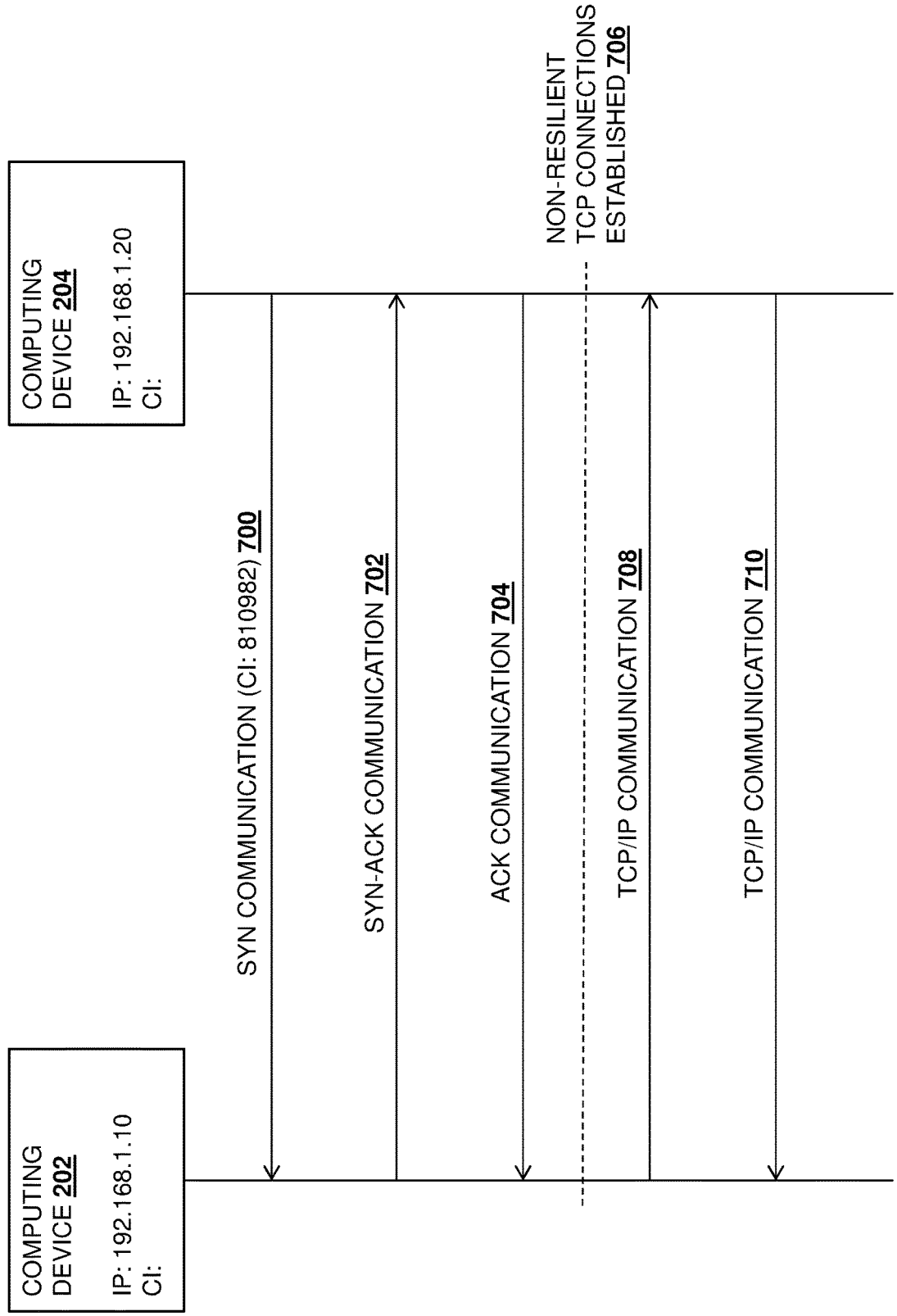
FIG. 7 is a swim-lane diagram illustrating an embodiment of non-resilient TCP connection establishment by the resilient TCP connection system of FIG. 2 during the method of FIG. 4.

If, at decision block 404, it is determined that a second TCP connection establishment communication including a second computing device connection identifier has not been received from the first computing device, the method 400 proceeds to block 406 where the second computing device establishes a non-resilient TCP connection with the first computing device. With reference to FIG. 7, in an embodiment of decision block 404, the computing device 202 may not support the resilient TCP connection functionality of the present disclosure, and as discussed above may respond to the SYN communication 700 transmitted at block 402 with a SYN-ACK communication 702 that does not include a second computing device identifier (e.g., does not use the TCP options field 502c in the SYN-ACK communication 702.) As such, in those examples, the resilient TCP connection engine 304 in the computing device 204/300 may determine that a SYN-ACK communication 702 has been received via its communication system 308 that does not include a second computing device identifier and, in response, may operate to establish a non-resilient TCP connection. For example, as illustrated in FIG. 7, in response to receiving the SYN-ACK communication 702, the resilient TCP connection engine 304 in the computing device 204/300 may generate and transmit an ACKnowledgement (ACK) communication 704 to the computing device 202 that does not include the first computing device connection identifier (CI: 810982 in the example provided), and instead includes the five-tuple information discussed above that is used to provide conventional TCP connections. As will be appreciated by one of skill in the art in possession of the present disclosure, following the transmission of the ACK communication 704 by the computing device 204 and its receipt by the computing device 202, the computing devices 202 and 204 may establish a non-resilient TCP connection (e.g., conventional TCP connection) 706 based on five-tuple information exchanged in the SYN communication 700 and the SYN-ACK communication 702.

As such, the non-resilient TCP connection from the perspective of the computing device 204 may be defined by the protocol being used to transmit communications between the computing devices 202 and 204, the IP address of the computing device 204 (e.g., a source IP address from the perspective of the computing device 204), the IP address of the computing device 202 (e.g., a destination IP address from the perspective of the computing device 204), the port identifier for the port on the computing device 204 that is being used to transmit communications to the computing device 202 (e.g., a source port identifier for a source port on the computing device 204 from the perspective of the computing device 204), and the port identifier for the port on the computing device 202 to which communications from the computing device 204 are being transmitted (e.g., a destination port identifier for a destination port on the computing device 202 from the perspective of the computing device 204.)

Similarly, the non-resilient TCP connection from the perspective of the computing device 202 may be defined by the protocol being used to transmit communications between the computing devices 202 and 204, the IP address of the computing device 202 (e.g., a source IP address from the perspective of the computing device 202), the IP address of the computing device 204 (e.g., a destination IP address from the perspective of the computing device 202), the port identifier for the port on the computing device 202 that is being used to transmit communications to the computing device 204 (e.g., a source port identifier for a source port on the computing device 202 from the perspective of the computing device 202), and the port identifier for the port on the computing device 204 to which communications from the computing device 202 are being transmitted (e.g., a destination port identifier for a destination port on the computing device 204 from the perspective of the computing device 202.)

The method 400 then proceeds to block 408 where the second computing device transmits TCP/IP communications with the first computing device via the non-resilient TCP connection. With reference to FIG. 7, in an embodiment of block 408 and subsequent to the establishment of the non-resilient TCP connection 706, the resilient TCP connection engine 304 in the computing device 204/300 may generate and transmit TCP/IP communications 708 via its communication system 308 to the computing device 202, and the computing device 202 may generate and transmit TCP/IP communications 710 to the computing device 202. As will be appreciated by one of skill in the art in possession of the present disclosure, the TCP/IP communications 708 and 710 may be substantially similar to conventional TCP/IP communications, and the computing devices 202 and 204 may operate to identify the non-resilient TCP connection 706 to which those conventional TCP/IP communications belong via the five-tuple information included in those conventional TCP/IP communications. As such, the non-resilient TCP connection 706 may "break" or end in the event the five-tuple information for either of the computing devices 202 and 204 changes as discussed above. Thus, the method 400 provides the ability to revert to conventional TCP connection establishment and use in the event one of the computing devices establishing a TCP connection does not support the resilient TCP connections of the present disclosure, with the understanding that such non-resilient TCP connections may end in the event five-tuple information for either of the computing devices associated with that non-resilient TCP connection changes.

If at decision block 404, it is determined that a second TCP connection establishment communication including a second computing device connection identifier has been received from the first computing device, the method 400 proceeds to decision block 410 where it is determined whether the second TCP connection establishment communication indicates that the first computing device connection identifier will be used. With reference to FIG. 8A, in an embodiment of decision block 404, the computing device 202 may support the resilient TCP connection functionality of the present disclosure and, similarly as discussed above, may respond to the SYN communication 800 transmitted at block 402 with a SYN-ACK communication 802 that includes a second computing device identifier. For example, in response to receiving the SYN communication 800 via its communication system 308, the resilient TCP connection engine 304 in the computing device 202/300 may generate and transmit the SYN-ACK communication 802 that includes a second computing device identifier.

As will be appreciated by one of skill in the art in possession of the present disclosure and with reference to FIG. 5, the SYN-ACK communication 802 transmitted by the computing device 202 at decision block 404 may include the five-tuple information discussed above that is conventionally used to define a conventional TCP connection, and thus may include protocol information for the protocol being used to transmit the SYN-ACK communication 802 in the protocol field 500a of the IP communication information 500, the IP address ("192.168.1.10") of the computing device 202 (i.e., a source IP address of a source computing device in this example) in the source address field 500b of the IP communication information 500, the IP address ("192.168.1.20") of the computing device 204 (i.e., a destination IP address of a destination computing device in this example) in the destination address field 500c of the IP communication information 500, a port identifier for the port on the computing device 202 that is being used to transmit the SYN-ACK communication 802 (i.e., a source port identifier of a source computing device in this example), and a port identifier for the port on the computing device 204 to which the SYN-ACK communication 802 is being sent (i.e., a destination port identifier of a destination computing device in this example.)

In addition, the SYN-ACK communication 802 may also includes a second computing device connection identifier (CI: 1098291 in the example provided) that is generated by the resilient TCP connection engine 304 in the computing device 202/300 and provided to the computing device 204 for use in TCP/IP communications via a resilient TCP connection. For example, the second computing device connection identifier may be provided by any identifier that is locally unique to the computing device 202 and not currently in use as described below. Similarly as discussed above, the second computing device connection identifier may be provided in one of the TCP options fields 502c in the TCP communication information 502. For example, a "TCP_RESILIENT" TCP option field may be defined in the TCP options fields 502c in the TCP communication information 502, and the computing device 202 may provide the second computing device connection identifier (CI: 1098291 in the example provided) in that TCP option field to, in effect, instruct the computing device 204 to utilize the second computing device connection identifier to identify itself in any subsequent communications with the computing device 202. However, while a specific example has been provided, one of skill in the art in possession of the present disclosure will appreciate that other techniques for transmitting the connection identifier of the present disclosure between computing device may be utilized while remaining within the scope of the present disclosure as well.

As discussed above, in some examples, the computing device 202 may support the resilient TCP connection functionality of the present disclosure but may determine that its IP address and/or port used to transmit communications with the computing device 204 is not expected to change, and may respond to the SYN communication 800 transmitted at block 402 with a SYN-ACK communication that includes the second computing device identifier but that also indicates that it will not use of the first computing device connection identifier in subsequent communications. For example, the computing device 202 may be a server device that rarely (if ever) experiences changes to its IP address or port connections, and thus may determine that TCP/IP communications that is transmits via the resilient TCP connection of the present disclosure may be smaller in size by not utilizing the connection identifiers of the present disclosure, while the infrequency of changes in its IP address or port connections provides sufficient confidence that the TCP connection will not break or end due to an IP address or port connection change. In a specific example, the connection identifiers provided as TCP options in the present disclosure may be associated with an overhead of 6 bytes: 1 byte for the TCP option identifier, 1 byte for the option value length, and 4 bytes for the connection identifier. As such, that overhead may be eliminated when the possibility of five-tuple-information-change-induced TCP connection breaks are low.

As such, in a specific example, a "SYMMETRIC_TCP_RESILIENT" TCP option field may be defined in the TCP options fields 502c in the TCP communication information 502 for situations in which both computing devices that are part of a resilient TCP connection will utilize the connection identifiers of the present disclosure (referred to as a "symmetric resilient TCP connection" below due to both computing devices utilizing the connection identifiers of the present disclosure), while an "ASYMMETRIC_TCP_RESILIENT" TCP option field may be defined in the TCP options fields 502c in the TCP communication information 502 for situations in which only one of the computing devices that are part of a resilient TCP connection will utilize the connection identifiers of the present disclosure (referred to as an "asymmetric resilient TCP connection" below due to only one of the computing devices utilizing the connection identifiers of the present disclosure). Thus, in the event the resilient TCP connection engine 304 in the computing device 202/300 determines that it will utilize the first computing device connection identifier, the resilient TCP connection engine 304 in the computing device 202/300 may transmit the SYN-ACK communication 802 with the second computing device connection identifier in the "SYMMETRIC_TCP_RESILIENT" TCP option field. Similarly, in the event the resilient TCP connection engine 304 in the computing device 202/300 determines that does not need to utilize the first computing device connection identifier, the resilient TCP connection engine 304 in the computing device 202/300 may transmit the SYN-ACK communication 802 with the second computing device connection identifier in the "ASYMMETRIC_TCP_RESILIENT" TCP option field. However, while a specific example of indicating whether a connection identifier will be utilized by a computing device involved in a resilient TCP connection has been described, one of skill in the art in possession of the present disclosure will appreciate that other techniques for indicating whether a connection identifier will be utilized by a computing device involved in a resilient TCP connection will fall within the scope of the present disclosure as well.

As such, at decision block 410, the resilient TCP connection engine 304 in the computing device 204/300 may determine whether the SYN-ACK communication 802 includes the second computing device connection identifier in the "SYMMETRIC_TCP_RESILIENT" TCP option field and thus whether the computing device 202 will be using the first computing device connection identifier in subsequent TCP/IP communications, or whether the SYN-ACK communication 802 includes the second computing device connection identifier in the "ASYMMETRIC_TCP_RESILIENT" TCP option field and thus whether the computing device 202 will not be using the first computing device connection identifier in subsequent TCP/IP communications.

Figure 8B:
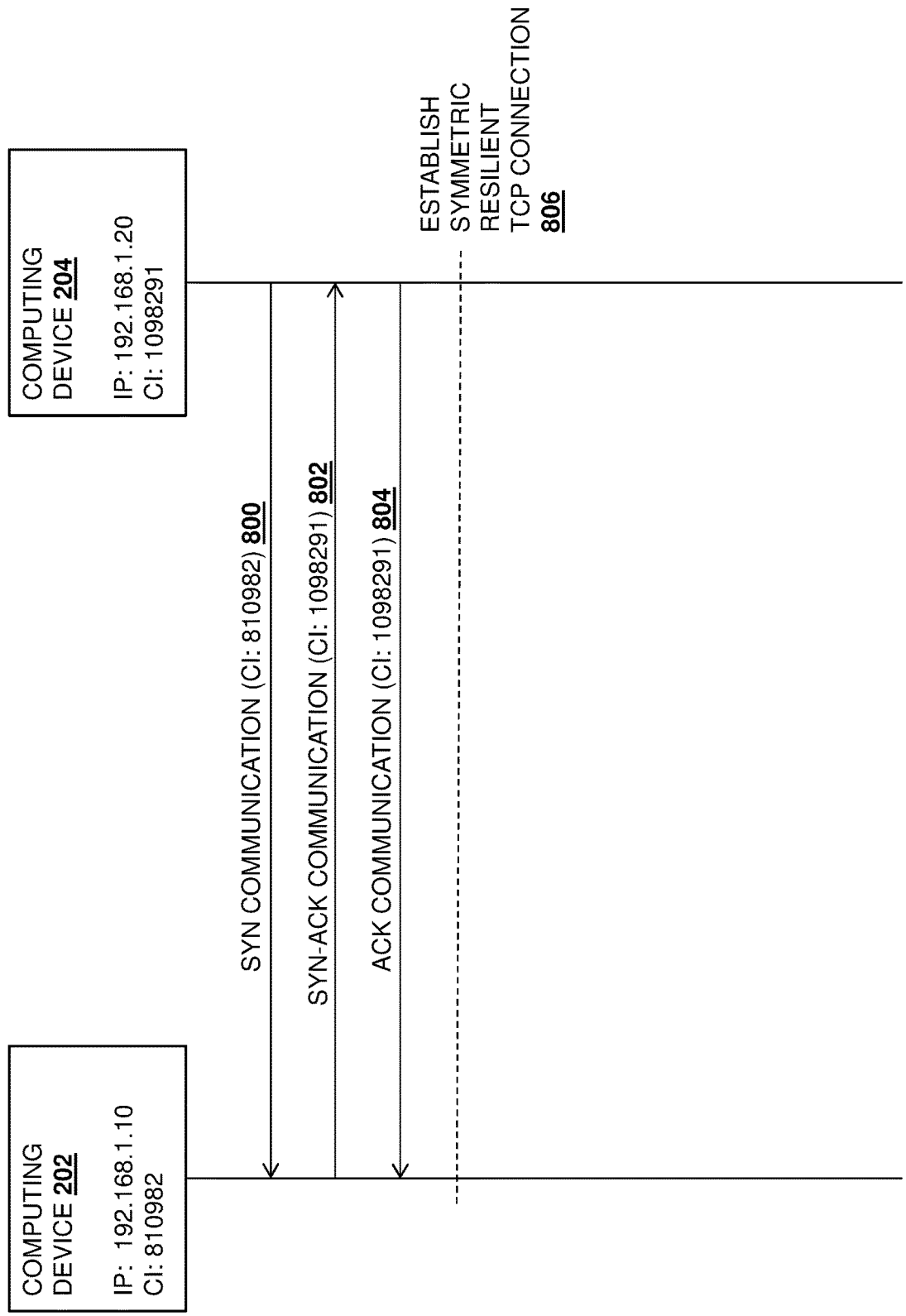
FIG. 8B is a swim-lane diagram illustrating an embodiment of symmetric resilient TCP connection establishment by the resilient TCP connection system of FIG. 2 during the method of FIG. 4.

If, at decision block 410, it is determined that the second TCP connection establishment communication indicates that the first computing device connection identifier will be used, the method 400 proceeds to block 412 where the second computing device establishes a symmetric resilient TCP connection with the first computing device. With reference to FIG. 8B, in an embodiment and in response to determining that the SYN-ACK communication 802 includes the second computing device connection identifier in the "SYMMETRIC_TCP_RESILIENT" TCP option field and thus the computing device 202 will be using the first computing device connection identifier in subsequent TCP/IP communications, the resilient TCP connection engine 304 in the computing device 204/300 may generate and transmit an ACK communication 804 via its communication system 308 to the computing device 202 that includes the second computing device connection identifier (CI: 1098291 in the example provided). Following the transmission of the ACK communication 804 by the computing device 204 and its receipt by the computing device 202, the computing devices 202 and 204 may establish a symmetric resilient TCP connection 806 based on the first and second computing device connection identifiers exchanged in SYN communication 800 and the SYN-ACK communication 802.

As such, the symmetric resilient TCP connection 806 from the perspective of the computing device 204 may be defined by the first computing device connection identifier (CI: 810982 in the example provided) that will be utilized by the computing device 202 in subsequent communications with the computing device 204, while the symmetric resilient TCP connection 806 from the perspective of the computing device 202 may be defined by the second computing device connection identifier (CI: 1098291 in the example provided) that will be utilized by the computing device 204 in subsequent communications with the computing device 202. As will be appreciated by one of skill in the art in possession of the present disclosure, the five-tuple information discussed above may continue to be provided in the subsequent TCP/IP communications transmitted between the computing devices 202 and 204 (and may be stored in their respective resilient TCP connection databases 306), but is not utilized to define the symmetric resilient TCP connection 806 utilized by the computing devices 202 and 204 to communicate with each other.

Figure 8C:
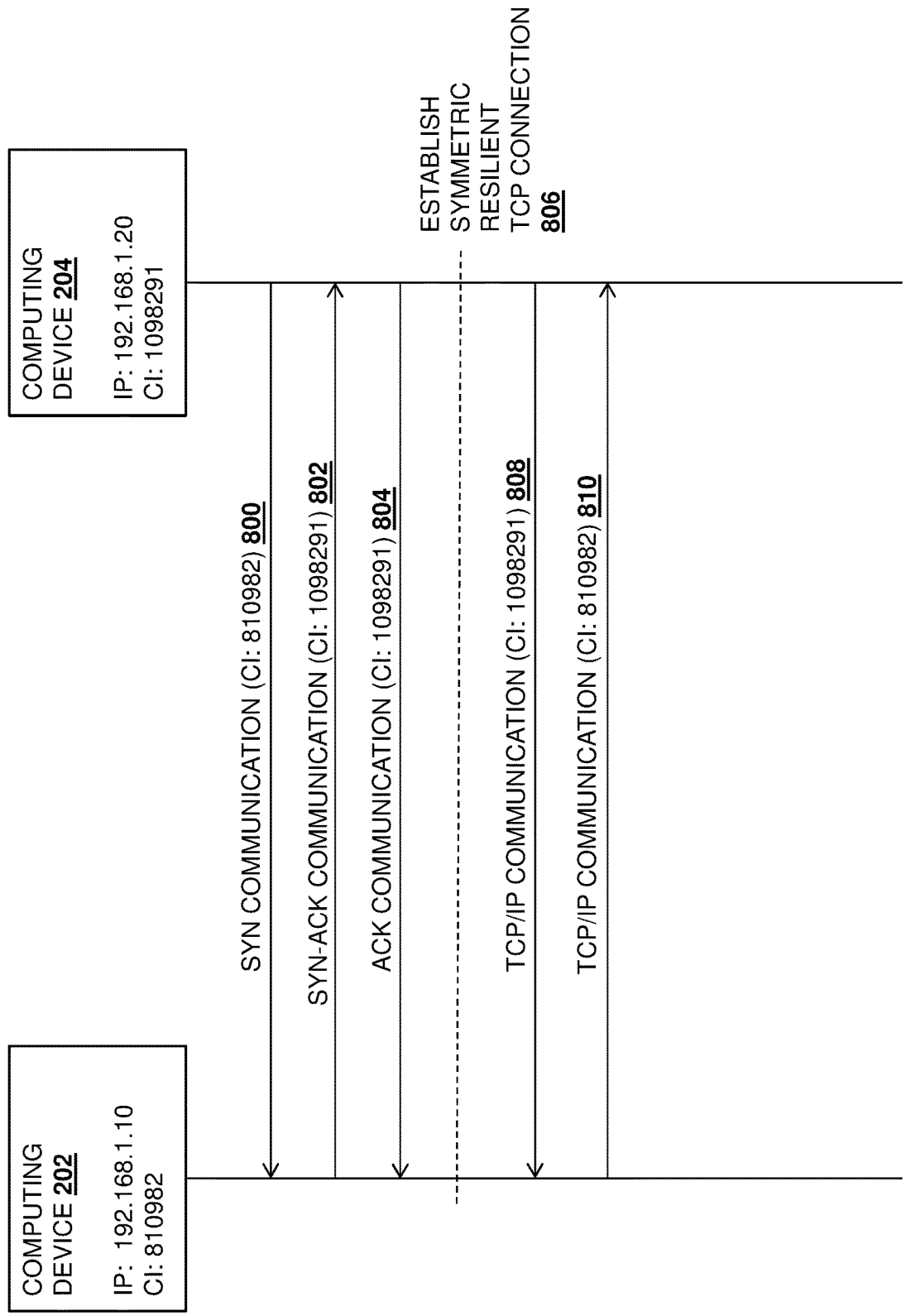
FIG. 8C is a swim-lane diagram illustrating an embodiment of TCP/IP communications via a symmetric resilient TCP connection provided in the resilient TCP connection system of FIG. 2 during the method of FIG. 4.

The method 400 then proceeds to block 414 where the second computing device transmits TCP/IP communications via the symmetric resilient TCP connection to the first computing device including the second computing device connection identifier. With reference to FIG. 8C, in an embodiment of block 414, the resilient TCP connection engine 304 in the computing device 204/300 may generate and transmit TCP/IP communications 808 via its communication system 308, and the resilient TCP connection engine 304 in the computing device 202/300 may receive those TCP/IP communications 808 via its communication system 308. As illustrated, the TCP/IP communications transmitted 808 by the computing device 204 to the computing device 202 will include the second computing device connection identifier (CI: 1098291 in the example provided) that was provided to the computing device 204 by the computing device 202 for TCP/IP communications transmitted via the symmetric resilient TCP connection 806. For example, as discussed above, the resilient TCP connection engine 304 in the computing device 204/300 may generate the TCP/IP communication 808 and provide the second computing device connection identifier (CI: 1098291 in the example provided) in the TCP option field discussed above (e.g., the "TCP_RESILIENT" TCP option field, the "SYMMETRICAL_TCP_RESILIENT" TCP option field, etc.) before transmitting the TCP/IP communication 808 to the computing device 202.

As discussed above, the TCP/IP communication 808 transmitted by the computing device 204 at block 414 may also include the five-tuple information discussed above that is conventionally used to define a conventional TCP connection, and thus may include protocol information for the protocol being used to transmit the TCP/IP communication 808 in the protocol field 500a of the IP communication information 500, the IP address ("192.168.1.20") of the computing device 204 (i.e., a source IP address of a source computing device in this example) in the source address field 500b of the IP communication information 500, the IP address ("192.168.1.10") of the computing device 202 (i.e., a destination IP address of a destination computing device in this example) in the destination address field 500c of the IP communication information 500, a port identifier for the port on the computing device 204 that is being used to transmit the TCP/IP communication 808 (i.e., a source port identifier of a source computing device in this example), and a port identifier for the port on the computing device 202 to which the TCP/IP communication 808 is being sent (i.e., a destination port identifier of a destination computing device in this example.)

As such, at block 414, the resilient TCP connection engine 304 in the computing device 202/300 may receive the TCP/IP communication 808 via its communication system 308 from the computing device 204, identify the second computing device connection identifier (CI: 1098291 in the example provided), and determine that the TCP/IP communication 808 belongs to the symmetrical resilient TCP connection 806 that it established with the computing device 204 (e.g., via an association between the computing device 204 and that second computing device connection identifier in its resilient TCP connection database 306.) As such, the computing device 202 is able to identify the symmetrical resilient TCP connection 806 utilized by the computing device 204 to communicate with the computing device 202 via the second computing device connection identifier it assigned to the computing device 204 for use with TCP/IP communications sent via that symmetrical resilient TCP connection 806.

The method 400 then proceeds to block 416 where the second computing device receives TCP/IP communications via the symmetric resilient TCP connection from the first computing device that include the first computing device connection identifier. With reference to FIG. 8C, in an embodiment of block 416, the resilient TCP connection engine 304 in the computing device 202/300 may generate and transmit TCP/IP communications 810 via its communication system 308, and the resilient TCP connection engine 304 in the computing device 204/300 may receive those TCP/IP communications 810 via its communication system 308. As illustrated, the TCP/IP communications transmitted 810 by the computing device 202 to the computing device 204 will include the first computing device connection identifier (CI: 810982 in the example provided) that was provided to the computing device 202 by the computing device 204 for TCP/IP communications transmitted via the symmetric resilient TCP connection 806. For example, as discussed above, the resilient TCP connection engine 304 in the computing device 202/300 may generate the TCP/IP communication 810 and provide the first computing device connection identifier (CI: 810982 in the example provided) in the TCP option field discussed above (e.g., the "TCP_RESILIENT" TCP option field, the "SYMMETRICAL_TCP_RESILIENT" TCP option field, etc.) before transmitting the TCP/IP communication 810 to the computing device 204.

As discussed above, the TCP/IP communication 810 transmitted by the computing device 202 at block 414 may also include the five-tuple information discussed above that is conventionally used to define a conventional TCP connection, and thus may include protocol information for the protocol being used to transmit the TCP/IP communication 810 in the protocol field 500a of the IP communication information 500, the IP address ("192.168.1.10") of the computing device 202 (i.e., a source IP address of a source computing device in this example) in the source address field 500b of the IP communication information 500, the IP address ("192.168.1.20") of the computing device 204 (i.e., a destination IP address of a destination computing device in this example) in the destination address field 500c of the IP communication information 500, a port identifier for the port on the computing device 202 that is being used to transmit the TCP/IP communication 810 (i.e., a source port identifier of a source computing device in this example), and a port identifier for the port on the computing device 204 to which the TCP/IP communication 810 is being sent (i.e., a destination port identifier of a destination computing device in this example.)

As such, at block 416, the resilient TCP connection engine 304 in the computing device 204/300 may receive the TCP/IP communication 810 via its communication system 308 from the computing device 202, identify the first computing device connection identifier (CI: 810982 in the example provided), and determine that the TCP/IP communication 810 belongs to the symmetrical resilient TCP connection 806 that it established with the computing device 202 (e.g., via an association between the computing device 202 and that first computing device connection identifier in its resilient TCP connection database 306.) As such, the computing device 204 is able to identify the symmetrical resilient TCP connection 806 utilized by the computing device 202 to communicate with the computing device 204 via the first computing device connection identifier it assigned to the computing device 202 for use with TCP/IP communications sent via that symmetrical resilient TCP connection 806

Figure 8D:
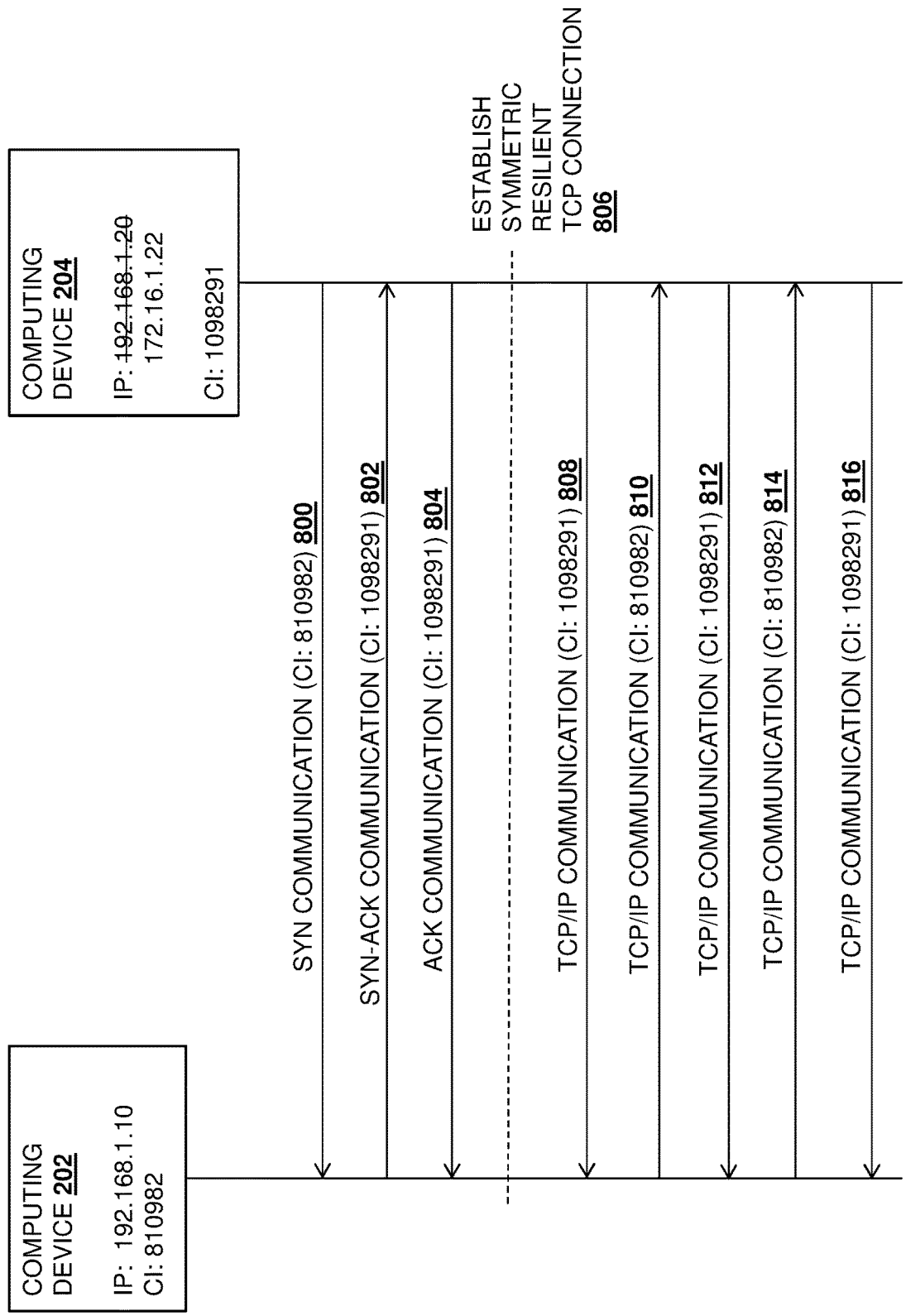
FIG. 8D is a swim-lane diagram illustrating an embodiment of TCP/IP communications via a symmetric resilient TCP connection provided in the resilient TCP connection system of FIG. 2 during the method of FIG. 4.

Furthermore, the identification of the symmetrical resilient TCP connection 806 by the computing devices 202 and 204 may be performed in substantially the same manner even in the event that the five-tuple information associated with the TCP/IP communications transmitted by the computing devices 202 and 204 changes. For example, with reference to FIGS. 8C and 8D, the IP address of the computing device 204 is illustrated as having changed (e.g., from "192.168.1.20" to "172.16.1.22" in the example provided) due to, for example, the computing device 204 switching between wireless networks with different SSIDs, the computing device 204 switching between a wireless and wired network, a Network Address Translator changing the IP address and port identifier for the computing device 204, etc. However, as can be seen in FIG. 8D, the subsequent TCP/IP communications 812 transmitted by the computing device 204 to the computing device 202 will still include the second computing device connection identifier (CI: 1098291 in the example provided), and thus the change in the five-tuple information in those TCP/IP communications 812 (e.g., the change of the IP address of the computing device 204 from "192.168.1.20" to "172.16.1.22") will not cause the symmetrical resilient TCP connection 806 to "break" or end, and rather the resilient TCP connection engine 304 in the computing device 202/300 will associate that new IP address ("172.16.1.22") with the second computing device connection identifier in its resilient TCP connection database 306, and subsequently use that new IP address along with the second computing device connection identifier in subsequent TCP/IP communications with the computing device 204. As such, the computing device 202 may then transmit TCP/IP communications 814 to the computing device 204 including the first computing device connection identifier, the computing device 204 may transmit TCP/IP communications 816 to the computing device 202 including the second computing device connection identifier, and so on.

Figure 8E:
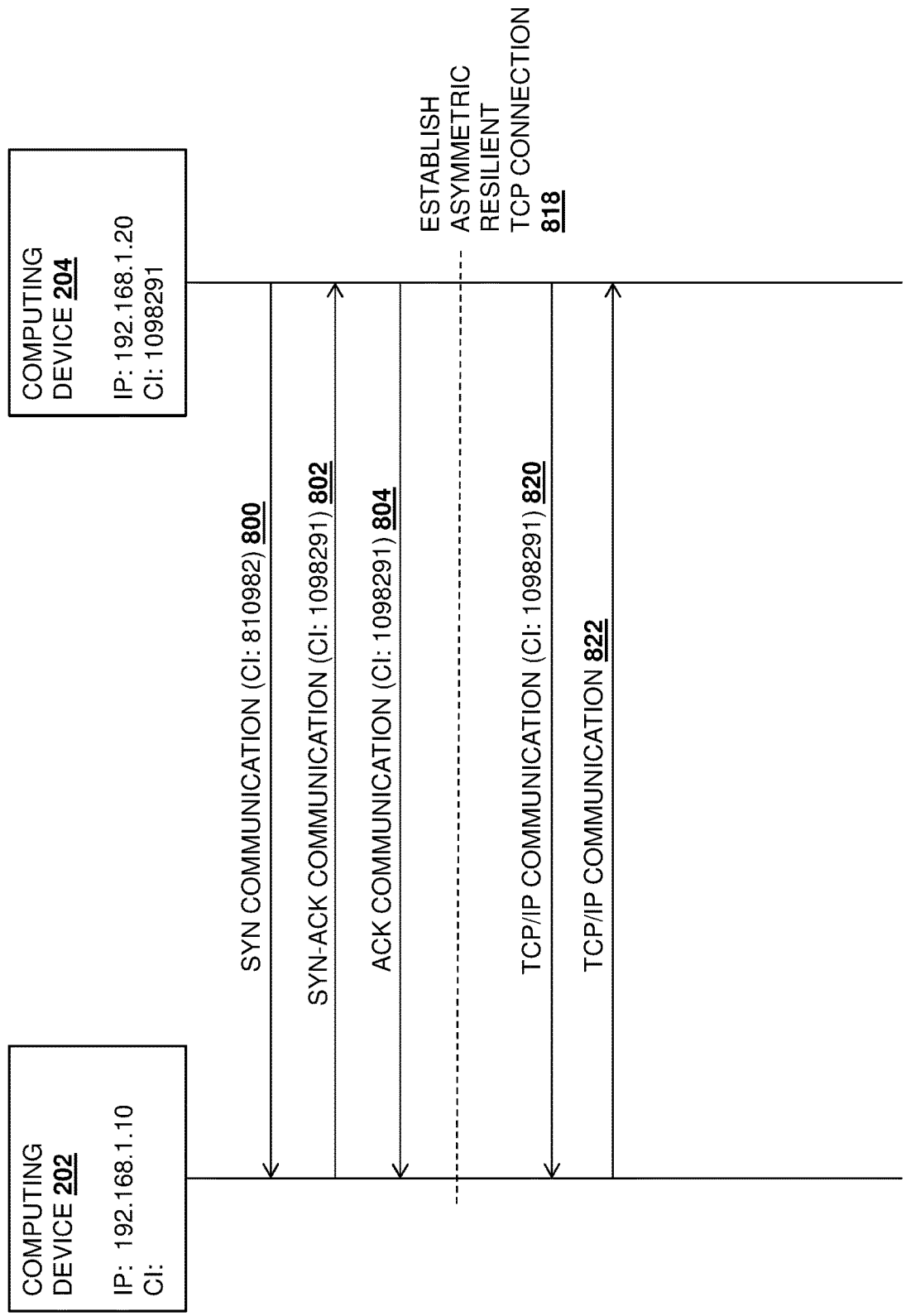
FIG. 8E is a swim-lane diagram illustrating an embodiment of asymmetric resilient TCP connection establishment by the resilient TCP connection system of FIG. 2 during the method of FIG. 4.

If, at decision block 410, it is determined that the second TCP connection establishment communication indicates that the first computing device connection identifier will not be used, the method 400 proceeds to block 418 where the second computing device establishes an asymmetric resilient TCP connection with the first computing device. With reference to FIG. 8E, in an embodiment and in response to determining that the SYN-ACK communication 802 includes the second computing device connection identifier in the "SYMMETRIC_TCP_RESILIENT" TCP option field and the computing device 202 will not be using the first computing device connection identifier in subsequent TCP/IP communications, the resilient TCP connection engine 304 in the computing device 204/300 may generate and transmit the ACK communication 804 via its communication system 308 to the computing device 202 that includes the second computing device connection identifier (CI: 1098291 in the example provided). Following the transmission of the ACK communication 804 by the computing device 204 and its receipt by the computing device 202, the computing devices 202 and 204 may establish an asymmetric resilient TCP connection 818 based on the five-tuple information exchanged in the SYN communication 800 and the second computing device connection identifier exchanged in the SYN-ACK communication 802.

As such, the asymmetric resilient TCP connection 818 from the perspective of the computing device 204 may be defined by the five-tuple information that will be utilized by the computing device 202 in subsequent communications with the computing device 204, while the asymmetric resilient TCP connection 818 from the perspective of the computing device 202 may be defined by the second computing device connection identifier (CI: 1098291 in the example provided) that will be utilized by the computing device 204 in subsequent communications with the computing device 202. As will be appreciated by one of skill in the art in possession of the present disclosure, in addition to the five-tuple information utilized in communications by the computing device 202 to identify the asymmetric resilient TCP connection 818, the five-tuple information discussed above may continue to be provided in the subsequent TCP/IP communications transmitted by the computing device 204 to the computing device 202 (with the five-tuple information stored in the respective resilient TCP connection databases 306 in the computing devices 202/300 and 204/300), but is not utilized to define the asymmetric resilient TCP connection 818 utilized by the computing device 204 to communicate with the computing device 202.

The method 400 then proceeds to block 420 where the second computing device transmits TCP/IP communications via the asymmetric resilient TCP connection 818 to the first computing device including the second computing device connection identifier. With reference to FIG. 8E, in an embodiment of block 420, the resilient TCP connection engine 304 in the computing device 204/300 may generate and transmit TCP/IP communications 820 via its communication system 308, and the resilient TCP connection engine 304 in the computing device 202/300 may receive those TCP/IP communications 820 via its communication system 308. As illustrated, the TCP/IP communications 820 transmitted by the computing device 204 to the computing device 202 will include the second computing device connection identifier (CI: 1098291 in the example provided) that was provided to the computing device 204 by the computing device 202 for TCP/IP communications transmitted via the asymmetric resilient TCP connection 818. For example, as discussed above, the resilient TCP connection engine 304 in the computing device 204/300 may generate the TCP/IP communication 820 and provide the second computing device connection identifier (CI: 1098291 in the example provided) in the TCP option field discussed above (e.g., the "TCP_RESILIENT" TCP option field, the "ASYMMETRICAL_TCP_RESILIENT" TCP option field, etc.) before transmitting the TCP/IP communication 820 to the computing device 202.

As discussed above, the TCP/IP communication 820 transmitted by the computing device 204 at block 414 may also include the five-tuple information discussed above that is conventionally used to define a conventional TCP connection, and thus may include protocol information for the protocol being used to transmit the TCP/IP communication 820 in the protocol field 500a of the IP communication information 500, the IP address ("192.168.1.20") of the computing device 204 (i.e., a source IP address of a source computing device in this example) in the source address field 500b of the IP communication information 500, the IP address ("192.168.1.10") of the computing device 202 (i.e., a destination IP address of a destination computing device in this example) in the destination address field 500c of the IP communication information 500, a port identifier for the port on the computing device 204 that is being used to transmit the TCP/IP communication 820 (i.e., a source port identifier of a source computing device in this example), and a port identifier for the port on the computing device 202 to which the TCP/IP communication 820 is being sent (i.e., a destination port identifier of a destination computing device in this example.)

As such, at block 420, the resilient TCP connection engine 304 in the computing device 202/300 may receive the TCP/IP communication 820 via its communication system 308 from the computing device 204, identify the second computing device connection identifier (CI: 1098291 in the example provided), and determine that the TCP/IP communication 820 belongs to the asymmetrical resilient TCP connection 818 that it established with the computing device 204 (e.g., via an association between the computing device 204 and that second computing device connection identifier in its resilient TCP connection database 306.) Thus, the computing device 202 is able to identify the asymmetrical resilient TCP connection 818 utilized by the computing device 204 to communicate with the computing device 202 via the second computing device connection identifier it assigned to the computing device 204 for use with TCP/IP communications sent via that asymmetrical resilient TCP connection 818.

The method 400 then proceeds to block 422 where the second computing device receives TCP/IP communications via the symmetric resilient TCP connection from the first computing device that do not include the first computing device connection identifier. With reference to FIG. 8E, in an embodiment of block 422, the resilient TCP connection engine 304 in the computing device 202/300 may generate and transmit TCP/IP communications 822 via its communication system 308, and the resilient TCP connection engine 304 in the computing device 204/300 may receive those TCP/IP communications 822 via its communication system 308. As illustrated, the TCP/IP communications transmitted 822 by the computing device 202 to the computing device 204 will not include the first computing device connection identifier (that was provided to the computing device 202 by the computing device 204. For example, as discussed above, the computing device 202 may have determined that its five-tuple information (e.g., its IP address or port identifier for the port used for communications with the computing device 204) is rarely subject to change, and may have informed the computing device 204 that it would not use the first computing device connection identifier in subsequent TCP/IP communications.

As such, the TCP/IP communication 822 transmitted by the computing device 202 at block 422 may include the five-tuple information discussed above that is conventionally used to define a conventional TCP connection, and thus may include protocol information for the protocol being used to transmit the TCP/IP communication 822 in the protocol field 500a of the IP communication information 500, the IP address ("192.168.1.10") of the computing device 202 (i.e., a source IP address of a source computing device in this example) in the source address field 500b of the IP communication information 500, the IP address ("192.168.1.20") of the computing device 204 (i.e., a destination IP address of a destination computing device in this example) in the destination address field 500c of the IP communication information 500, a port identifier for the port on the computing device 202 that is being used to transmit the TCP/IP communication 822 (i.e., a source port identifier of a source computing device in this example), and a port identifier for the port on the computing device 204 to which the TCP/IP communication 822 is being sent (i.e., a destination port identifier of a destination computing device in this example.)

As such, at block 422, the resilient TCP connection engine 304 in the computing device 204/300 may receive the TCP/IP communication 822 via its communication system 308 from the computing device 202, identify the five-tuple information included therein, and determine that the TCP/IP communication 822 belongs to the asymmetrical resilient TCP connection 818 that it established with the computing device 202 (e.g., via an association between the computing device 202 and that five-tuple information in its resilient TCP connection database 306.) Thus, the computing device 204 must identify the asymmetrical resilient TCP connection 818 utilized by the computing device 202 to communicate with the computing device 204 via the five-tuple information included in the TCP/IP communications 822 sent via that symmetric resilient TCP connection 818. As will be appreciated by one of skill in the art in possession of the present disclosure, any change in the five-tuple information associated with the TCP/IP communications transmitted by the computing device 202 will cause the TCP connection utilized by the computing device 202 to communicate with the computing device 204 to "break" or end, but as discussed above, embodiments in which the first computing device connection identifier is not utilized by the computing device 202 may be selected only in situations in which that five-tuple information is very unlikely to change, and thus will save on the TCP/IP communication overhead by not utilizing that first computing device connection identifier in those TCP/IP communications.

Figure 8F:
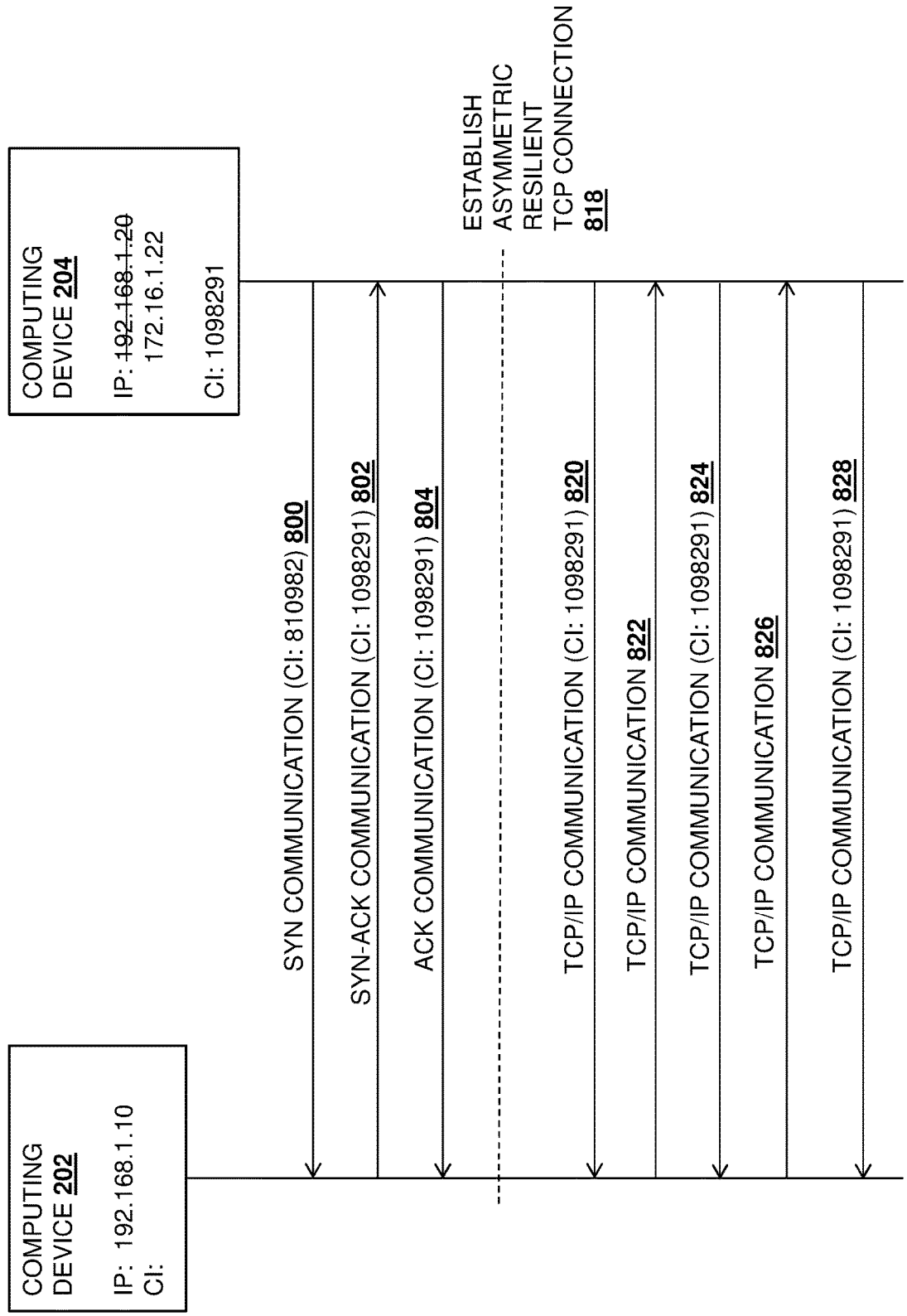
FIG. 8F is a swim-lane diagram illustrating an embodiment of TCP/IP communications via an a symmetric resilient TCP connection provided in the resilient TCP connection system of FIG. 2 during the method of FIG. 4.

However, similarly as discussed above, the identification of the asymmetrical resilient TCP connection 818 by the computing device 202 may be performed in substantially the same manner even in the event that the five-tuple information associated with the TCP/IP communications transmitted by the computing device 204 changes. For example, with reference to FIG. 8F, the IP address of the computing device 204 is illustrated as having changed (e.g., from "192.168.1.20" to "172.16.1.22" in the example provided) due to, for example, the computing device 204 switching between wireless networks with different SSIDs, the computing device 204 switching between a wireless and wired network, a Network Address Translator changing the IP address and port identifier for the computing device 204, etc. However, as can be seen in FIG. 8F, the subsequent TCP/IP communications 824 transmitted by the computing device 204 to the computing device 202 will still include the second computing device connection identifier (CI: 1098291 in the example provided), and thus the change in the five-tuple information in those TCP/IP communications 824 (e.g., the change of the IP address of the computing device 204 from "192.168.1.20" to "172.16.1.22") will not cause the symmetrical resilient TCP connection 818 to "break" or end, and rather the resilient TCP connection engine 304 in the computing device 202/300 may simply associate that new IP address ("172.16.1.22") with the second computing device connection identifier in its resilient TCP connection database 306. As such, the computing device 202 may then transmit TCP/IP communications 826 to the computing device 204 including the five-tuple information, the computing device 204 may transmit TCP/IP communications 828 to the computing device 202 including the second computing device connection identifier, and so on.

Figure 9:
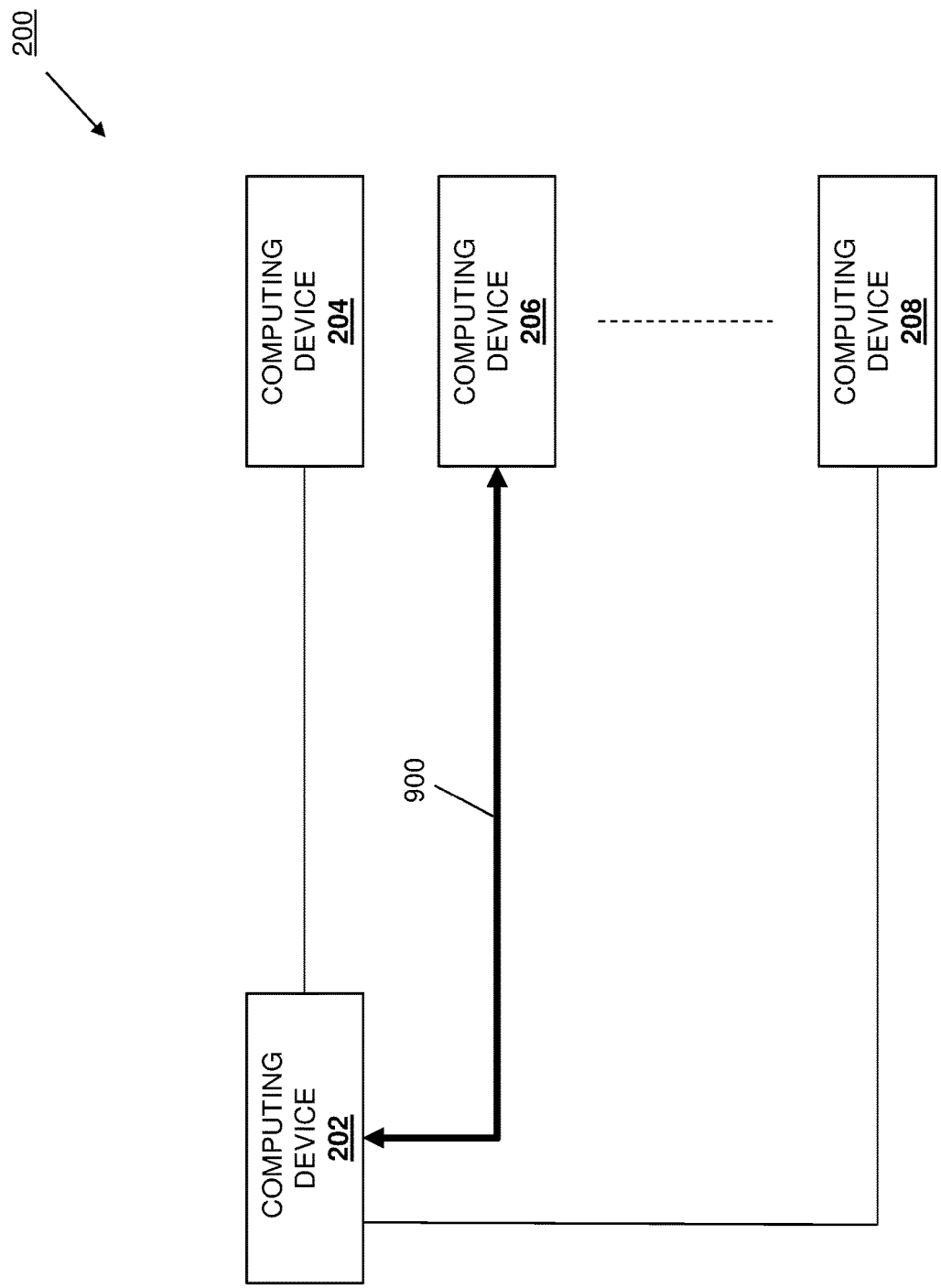
FIG. 9 is a schematic view illustrating an embodiment of the resilient TCP connection system of FIG. 2 operating during the method of FIG. 4.
Figure 10:
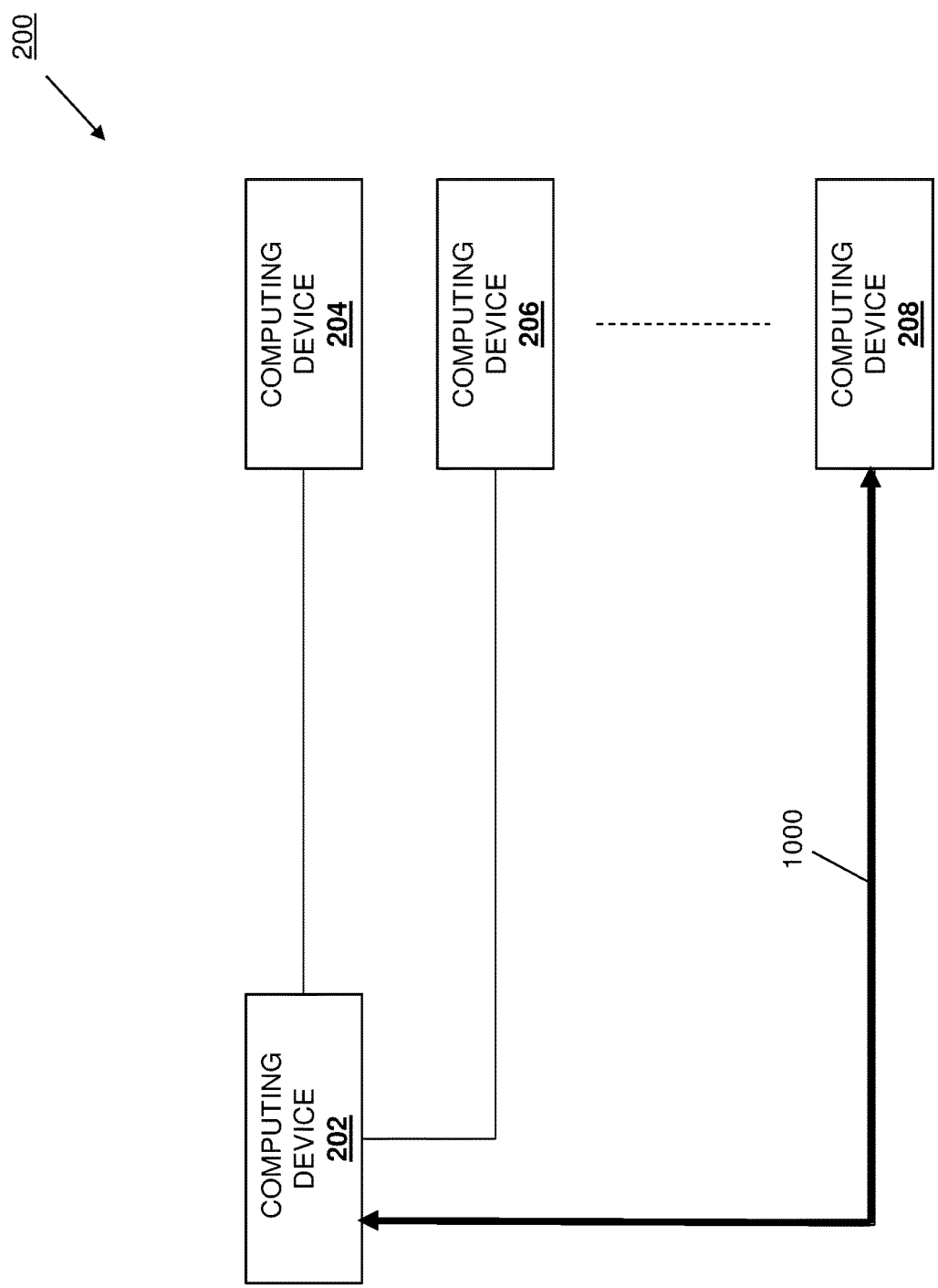
FIG. 10 is a schematic view illustrating an embodiment of the resilient TCP connection system of FIG. 2 operating during the method of FIG. 4.

With reference to FIG. 9, in other embodiments of the method 400, the computing device 202 (the "first computing device" in this example) and the computing device 206 (a "third computing device" in this example) may exchange communications 900 and may operate substantially similarly as described above for the computing devices 202 and 204 during the method 400. Similarly, with reference to FIG. 10, in other embodiments of the method 400, the computing device 202 (the "first computing device" in this example) and the computing device 208 (a "fourth computing device" in this example) may exchange communications 1000 and may operate substantially similarly as described above for the computing devices 202 and 204 during the method 400. As will be appreciated by one of skill in the art in possession of the present disclosure, each connection identifier provided by the computing device 202 to the computing devices 204, 206, and 208 must be unique in order for the computing device 202 to distinguish TCP/IP communications received via resilient TCP connections provided with each of the computing devices 204, 206, and 208. However, the computing device 202 may utilize the same connection identifier with multiple different computing devices 204, 206, and 208 (e.g., the computing device 202 may utilize the connection identifier "810982" with both the computing device 204 and the computing device 206, as that will still allow each of those computing devices 204 and 206 to uniquely identify the resilient TCP connection that it provides with the computing device 202.)

Thus, systems and methods have been described that provide connection identifiers in TCP/IP communications provided via a TCP connection, which allows a second computing device to identify TCP/IP communications with a first computing device based on the connection identifier utilized by the first computing device in those TCP/IP communications even when the IP address of that first computing device (or port on that first computing device that is used to transmit the TCP/IP communications) changes following the establishment of the TCP connection. For example, a second computing device may transmit a first TCP connection establishment communication that includes a first computing device TCP connection identifier to the first computing device and, in response, may receive a second TCP connection establishment communication that includes a second computing device TCP connection identifier from the first computing device. The second computing device may then establish a resilient TCP connection with the first computing device that is enabled by the second computing device providing the second computing device TCP connection identifier in each TCP/IP communication transmitted to the first computing device via the first resilient TCP connection, and identifying the first computing device TCP connection identifier in each TCP/IP communication received from the first computing device via the first resilient TCP connection. As will be appreciated by one of skill in the art in possession of the present disclosure, the use of the first and second computing device TCP connection identifier in the TCP/IP communications enable the resilient TCP connection by allowing that resilient TCP connection to continue even in the event of IP address changes, port changes, and/or other changes in the first and second computing devices that would cause a conventional TCP connection to "break" or end.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for providing a resilient Transmission Control Protocol (TCP) connection, comprising:

transmitting, by a second computing device to a first computing device, a first Transmission Control Protocol (TCP) connection establishment communication that includes a first computing device TCP connection identifier and a first set of tuple information;

receiving, by the second computing device from the first computing device in response to the first TCP connection establishment communication, a second TCP connection establishment communication that includes a second computing device TCP connection identifier and a second set of tuple information;

establishing, by the second computing device with the first computing device in response to receiving the second TCP connection establishment communication, a first resilient TCP connection;

providing, by the second computing device in each TCP/IP communication transmitted to the first computing device via the first resilient TCP connection, the second computing device TCP connection identifier;

identifying, by the second computing device in each TCP/IP communication received from the first computing device via the first resilient TCP connection, the first computing device TCP connection identifier;

detecting, by the second computing device, that a first TCP/IP communication, which is received from the first computing device via the first resilient TCP connection and is expected to include the second set of tuple information, includes a third set of tuple information that is different than the second set of tuple information, wherein the third set of tuple information being included in the first TCP/IP communication when the second set of tuple information is expected would cause a non-resilient TCP connection to be ended; and maintaining, by the second computing device and based on identifying the first computing device TCP connection identifier in the first TCP/IP communication received from the first computing device, the first resilient TCP connection.

2. The method of claim 1, further comprising:

transmitting, by the second computing device to a third computing device, a third TCP connection establishment communication that includes a third computing device TCP connection identifier;

receiving, by the second computing device from the third computing device in response to the third TCP connection establishment communication, a fourth TCP connection establishment communication that does not include the second computing device TCP connection identifier; and establishing, by the second computing device with the third computing device in response to receiving the fourth TCP connection establishment communication, a non-resilient TCP connection.

3. The method of claim 1, further comprising:

transmitting, by the second computing device to a third computing device, a third TCP connection establishment communication that includes a third computing device TCP connection identifier;

receiving, by the second computing device from the third computing device in response to the third TCP connection establishment communication, a fourth TCP connection establishment communication that includes a fourth computing device TCP connection identifier and that indicates that the third computing device will not use the third computing device TCP connection identifier;

establishing, by the second computing device with the third computing device in response to receiving the fourth TCP connection establishment communication, a second resilient TCP connection;

providing, by the second computing device in each TCP/IP communication transmitted to the third computing device via the second resilient TCP connection, the fourth TCP connection identifier; and receiving, by the second computing device from the third computing device via the second resilient TCP connection, TCP/IP communications that do not include the third computing device TCP connection identifier.

4. The method of claim 1, further comprising:

transmitting, by the second computing device to a third computing device, a third TCP connection establishment communication that includes a third computing device TCP connection identifier;

receiving, by the second computing device from the third computing device in response to the third TCP connection establishment communication, a fourth TCP connection establishment communication that includes the second computing device TCP connection identifier;

establishing, by the second computing device with the third computing device in response to receiving the fourth TCP connection establishment communication, a second resilient TCP connection;

providing, by the second computing device in each TCP/IP communication transmitted to the third computing device via the second resilient TCP connection, the second computing device TCP connection identifier; and identifying, by the second computing device in each TCP/IP communication received from the third computing device via the second resilient TCP connection, the third TCP connection identifier.

5. The method of claim 1, wherein the first TCP connection establishment communication is a SYNchronize (SYN) communication, and wherein the first computing device TCP connection identifier is provided in an options field in the SYN communication, and wherein the second TCP connection establishment communication is a SYNchronize/ACKnowledgement (SYN/ACK) communication, and wherein the second computing device TCP connection identifier is provided in an options field in the SYN/ACK communication.

6. The method of claim 1, further comprising:

providing, by the second computing device in each TCP/IP communication transmitted to the first computing device via the first resilient TCP connection while the second computing device utilizes a first IP address, the second computing device TCP connection identifier; and providing, by the second computing device in each TCP/IP communication transmitted to the first computing device via the first resilient TCP connection while the second computing device utilizes a second IP address that is different than the first IP address, the second computing device TCP connection identifier.

7. The method of claim 1, further comprising:

providing, by the second computing device in each TCP/IP communication transmitted to the first computing device via the first resilient TCP connection and using a first port on the first computing device, the second computing device TCP connection identifier; and providing, by the second computing device in each TCP/IP communication transmitted to the first computing device via the first resilient TCP connection and using a second port on the first computing device that is different than the first port, the second computing device TCP connection identifier.

8. A resilient Transmission Control Protocol/Internet Protocol (TCP/IP) connection system, comprising:

a first computing device; and a second computing device that is coupled to the first computing device and that is configured to:

transmit, to the first computing device, a first Transmission Control Protocol (TCP) connection establishment communication that includes a first computing device TCP connection identifier and a first set of tuple information;

receive, from the first computing device in response to the first TCP connection establishment communication, a second TCP connection establishment communication that includes a second computing device TCP connection identifier and a second set of tuple information;

establish, with the first computing device in response to receiving the second TCP connection establishment communication, a first resilient TCP connection;

provide, in each TCP/IP communication transmitted to the first computing device via the first resilient TCP connection, the second computing device TCP connection identifier;

identify, in each TCP/IP communication received from the first computing device via the first resilient TCP connection, the first computing device TCP connection identifier;

detect that a first TCP/IP communication, which is received from the first computing device via the first resilient TCP connection and is expected to include the second set of tuple information, includes a third set of tuple information that is different than the second set of tuple information, wherein the third set of tuple information being included in the first TCP/IP communication when the second set of tuple information is expected would cause a non-resilient TCP connection to be ended; and maintain, based on identifying the first computing device TCP connection identifier in the first TCP/IP communication received from the first computing device, the first resilient TCP connection.

9. The system of claim 8, further comprising:
a third computing device that is coupled to the second computing device, wherein the second computing device is configured to:
transmit, to the third computing device, a third TCP connection establishment communication that includes a third computing device TCP connection identifier;
receive, from the third computing device in response to the third TCP connection establishment communication, a fourth TCP connection establishment communication that does not include the second computing device TCP connection identifier; and
establish, with the third computing device in response to receiving the fourth TCP connection establishment communication, a non-resilient TCP connection.

10. The system of claim 8, further comprising:
a third computing device that is coupled to the second computing device, wherein the second computing device is configured to:
transmit, to the third computing device, a third TCP connection establishment communication that includes a third computing device TCP connection identifier;
receive, from the third computing device in response to the third TCP connection establishment communication, a fourth TCP connection establishment communication that includes a fourth computing device TCP connection identifier and that indicates that the third computing device will not use the third computing device TCP connection identifier;
establish, with the third computing device in response to receiving the fourth TCP connection establishment communication, a second resilient TCP connection;
provide, in each TCP/IP communication transmitted to the third computing device via the second resilient TCP connection, the fourth TCP connection identifier; and
receive, from the third computing device via the second resilient TCP connection, TCP/IP communications that do not include the third TCP computing device connection identifier.

11. The system of claim 8, wherein the first TCP connection establishment communication is a SYNchronize (SYN) communication, and wherein the first computing device TCP connection identifier is provided in an options field in the SYN communication, and wherein the second TCP connection establishment communication is a SYNchronize/ACKnowledgement (SYN/ACK) communication, and wherein the second computing device TCP connection identifier is provided in an options field in the SYN/ACK communication.

12. The system of claim 8, wherein the second computing device is configured to:
provide, in each TCP/IP communication transmitted to the first computing device via the first resilient TCP connection while the second computing device utilizes a first IP address, the second computing device TCP connection identifier; and
provide, in each TCP/IP communication transmitted to the first computing device via the first resilient TCP connection while the second computing device utilizes a second IP address that is different than the first IP address, the second computing device TCP connection identifier.

13. The system of claim 8, wherein the second computing device is configured to:
provide, in each TCP/IP communication transmitted to the first computing device via the first resilient TCP connection and using a first port on the first computing device, the second computing device TCP connection identifier; and
provide, in each TCP/IP communication transmitted to the first computing device via the first resilient TCP connection and using a second port on the first computing device that is different than the first port, the second computing device TCP connection identifier.

14. An Information Handling System (IHS), comprising:
a processing system; and
a memory system that is coupled to the processing system and that includes instructions that, when executed by the processing system, cause the processing system to provide a resilient Transmission Control Protocol (TCP) connection engine that is configured to:
transmit, to a first computing device, a first Transmission Control Protocol (TCP) connection establishment communication that includes a first computing device TCP connection identifier and a first set of tuple information;
receive, from the first computing device in response to the first TCP connection establishment TCP IP communication, a second TCP connection establishment communication that includes a second computing device TCP connection identifier and a second set of tuple information;
establish, with the first computing device in response to receiving the second TCP connection establishment communication, a first resilient TCP connection;

provide, in each TCP/IP communication transmitted to the first computing device via the first resilient TCP connection, the second computing device TCP connection identifier; and identify, in each TCP/IP communication received from the first computing device via the first resilient TCP connection, the first computing device TCP connection identifier;

detect that a first TCP/IP communication, which is received from the first computing device via the first resilient TCP connection and is expected to include the second set of tuple information, includes a third set of tuple information that is different than the second set of tuple information, wherein the third set of tuple information being included in the first TCP/IP communication when the second set of tuple information is expected would cause a non-resilient TCP connection to be ended; and maintain, based on identifying the first computing device TCP connection identifier in the first TCP/IP communication received from the first computing device, the first resilient TCP connection.

15. The IHS of claim 14, wherein the resilient TCP connection engine is configured to:

transmit, to a third computing device, a third TCP connection establishment communication that includes a third computing device TCP connection identifier;

receive, from the third computing device in response to the third TCP connection establishment communication, a fourth TCP connection establishment communication that does not include the second computing device TCP connection identifier; and establish, with the third computing device in response to receiving the fourth TCP connection establishment communication, a non-resilient TCP connection.

16. The IHS of claim 14, wherein the resilient TCP connection engine is configured to:

transmit, to a third computing device, a third TCP connection establishment communication that includes a third computing device TCP connection identifier;

receive, from the third computing device in response to the third TCP connection establishment communication, a fourth TCP connection establishment communication that includes a fourth computing device TCP connection identifier and that indicates that the third computing device will not use the third computing device TCP connection identifier;

establish, with the third computing device in response to receiving the fourth TCP connection establishment communication, a second resilient TCP connection;

provide, in each TCP/IP communication transmitted to the third computing device via the second resilient TCP connection, the fourth TCP connection identifier; and receive, from the third computing device via the second resilient TCP connection, TCP/IP communications that do not include the third computing device TCP connection identifier.

17. The IHS of claim 14, wherein the resilient TCP connection engine is configured to:

transmit, to a third computing device, a third TCP connection establishment communication that includes a third computing device TCP connection identifier;

receive, from the third computing device in response to the third TCP connection establishment communication, a fourth TCP connection establishment communication that includes the second computing device TCP connection identifier;

establish, with the third computing device in response to receiving the fourth TCP connection establishment communication, a second resilient TCP connection;

provide, in each TCP/IP communication transmitted to the third computing device via the second resilient TCP connection, the second computing device TCP connection identifier; and identify, in each TCP/IP communication received from the third computing device via the second resilient TCP connection, the third TCP connection identifier.

18. The IHS of claim 14, wherein the first TCP connection establishment communication is a SYNchronize (SYN) communication, and wherein the first computing device TCP connection identifier is provided in an options field in the SYN communication, and wherein the second TCP connection establishment communication is a SYNchronize/ACKnowledgement (SYN/ACK) communication, and wherein the second computing device TCP connection identifier is provided in an options field in the SYN/ACK communication.

19. The IHS of claim 14, wherein the resilient TCP connection engine is configured to:

provide, in each TCP/IP communication transmitted to the first computing device via the first resilient TCP connection while the second computing device utilizes a first IP address, the second computing device TCP connection identifier; and provide, in each TCP/IP communication transmitted to the first computing device via the first resilient TCP connection while the second computing device utilizes a second IP address that is different than the first IP address, the second computing device TCP connection identifier.

20. The IHS of claim 14, wherein the resilient TCP connection engine is configured to:

provide, in each TCP/IP communication transmitted to the first computing device via the first resilient TCP connection and using a first port on the first computing device, the second computing device TCP connection identifier; and provide, in each TCP/IP communication transmitted to the first computing device via the first resilient TCP connection and using a second port on the first computing device that is different than the first port, the second computing device TCP connection identifier.

\* \* \* \* \*